(12) United States Patent
Wernick et al.

(10) Patent No.: US 12,113,681 B2
(45) Date of Patent: Oct. 8, 2024

(54) STATE BASED GUI FOR CLOUD DATA MANAGEMENT

(71) Applicant: Insight Engines, Inc., San Francisco, CA (US)

(72) Inventors: Grant M. Wernick, Los Gatos, CA (US); Darien Fitzgerald Kindlund, Great Falls, VA (US); Gururaj Singh, Milpitas, CA (US); Hsin-Yu Lin, San Francisco, CA (US); Edson Julius Ocampo Almachar, San Francisco, CA (US); Jacob A Perkins, Los Gatos, CA (US)

(73) Assignee: Insight Engines, Inc., San Francisco, CA (US)

( * ) Notice: Subject to any disclaimer, the term of this patent is extended or adjusted under 35 U.S.C. 154(b) by 44 days.

(21) Appl. No.: 17/942,690

(22) Filed: Sep. 12, 2022

(65) Prior Publication Data

US 2023/0336438 A1     Oct. 19, 2023

Related U.S. Application Data

(63) Continuation of application No. 17/078,022, filed on Oct. 22, 2020, now Pat. No. 11,444,847.
(Continued)

(51) Int. Cl.
*G06F 16/242*     (2019.01)
*G06F 3/04842*     (2022.01)
*H04L 41/22*     (2022.01)

(52) U.S. Cl.
CPC ...... *H04L 41/22* (2013.01); *G06F 3/04842* (2013.01); *G06F 16/243* (2019.01)

(58) Field of Classification Search
CPC ............... G06F 16/243; G06F 3/04842
See application file for complete search history.

(56) References Cited

U.S. PATENT DOCUMENTS

2009/0106640 A1    4/2009 Handy et al.
2010/0131889 A1    5/2010 Helmolt et al.
(Continued)

OTHER PUBLICATIONS

Giuseppe Santucci ("On Graph Based Interaction for semantic Query Langue", 0-8186-7469-5/96, 1996 IEEE) (Year: 1996).*
(Continued)

*Primary Examiner* — Anhtai V Tran
*Assistant Examiner* — Ken Hoang
(74) *Attorney, Agent, or Firm* — Haynes Beffel & Wolfeld, LLP; Ernest J. Beffel, Jr.

(57) ABSTRACT

The technology disclosed provides an interactive GUI driven by natural language questions and intuitive controls that support follow-up queries. One features a table-graph that links responsive series of data to graph elements. Individual rows of data in the table can be selected or deselected for display. The rows can be displayed in a single graph for individual graphs. Averages and other statistical measures can be calculated and graphed responsive to selectable controls, without formulas for series calculations. Another feature is so-called Liveboards that include multiple natural language questions and data views produced from executing queries derived from the questions, adapted to data available to a particular user, especially when the user's organization is different from an origin organization that generated the Liveboard.

23 Claims, 22 Drawing Sheets

Related U.S. Application Data

(60) Provisional application No. 62/924,559, filed on Oct. 22, 2019.

(56) References Cited

U.S. PATENT DOCUMENTS

| | | |
|---|---|---|
| 2011/0178938 A1 | 7/2011 | Reich-Weiser et al. |
| 2014/0040805 A1 | 2/2014 | Brereton et al. |
| 2016/0350950 A1 | 12/2016 | Ritchie et al. |
| 2017/0060868 A1* | 3/2017 | Rais Ghasem ....... G06F 16/243 |
| 2018/0024701 A1 | 1/2018 | Sanches et al. |
| 2018/0075131 A1* | 3/2018 | Van Hoof ........... G06F 16/2471 |
| 2018/0240138 A1 | 8/2018 | Le et al. |
| 2019/0034540 A1 | 1/2019 | Perkins et al. |
| 2019/0179856 A1* | 6/2019 | Krasadakis ............. G06F 40/30 |
| 2020/0302122 A1 | 9/2020 | Lai |
| 2020/0410302 A1 | 12/2020 | Swint et al. |

OTHER PUBLICATIONS

U.S. Appl. No. 15/147,113, filed May 5, 2016 now U.S. Pub. No. 10,545,956, filed Jan. 28, 2020.

* cited by examiner

Fig. 2

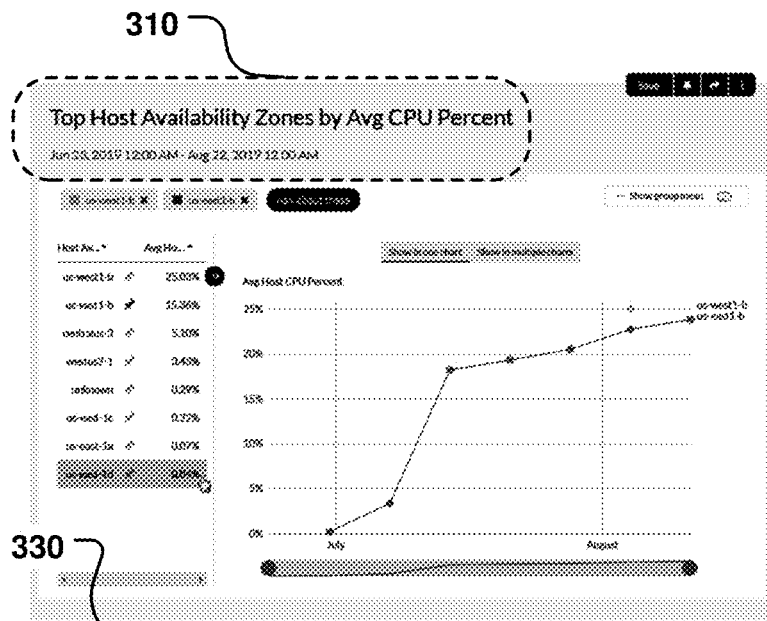
FIG. 3A
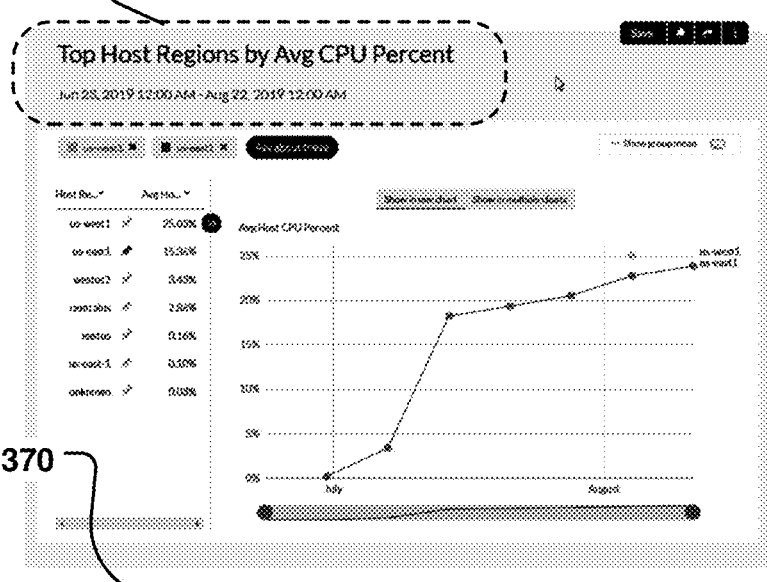
FIG. 3B
FIG. 3C

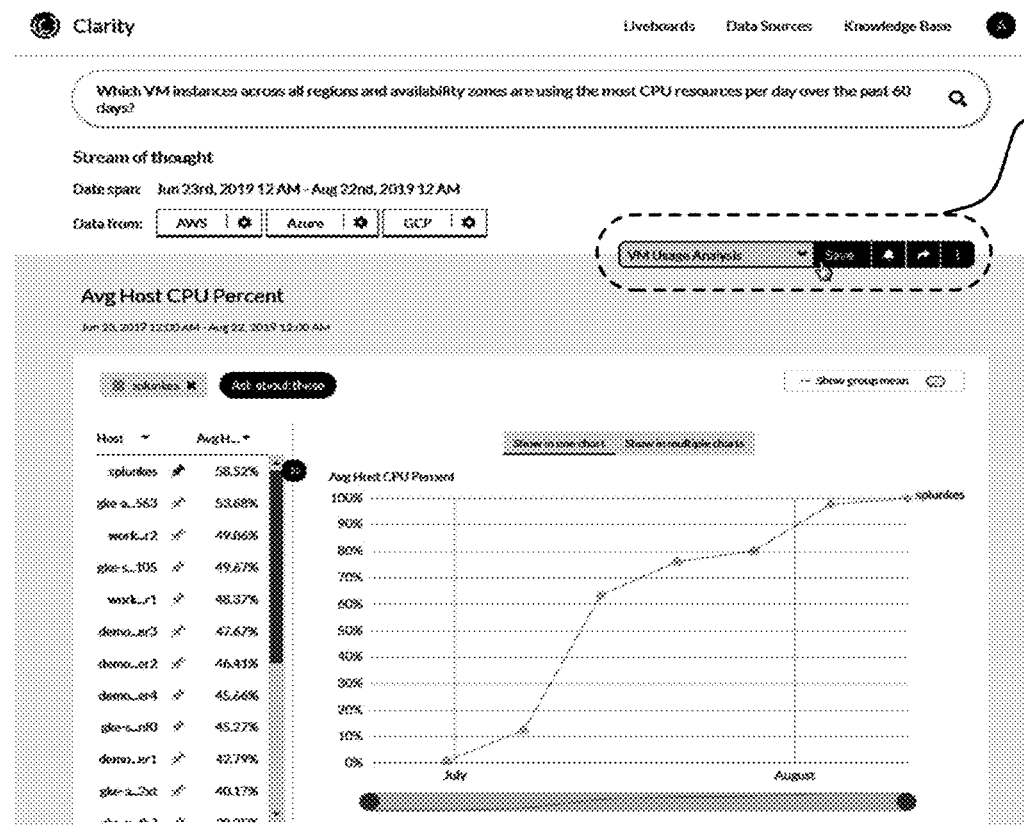
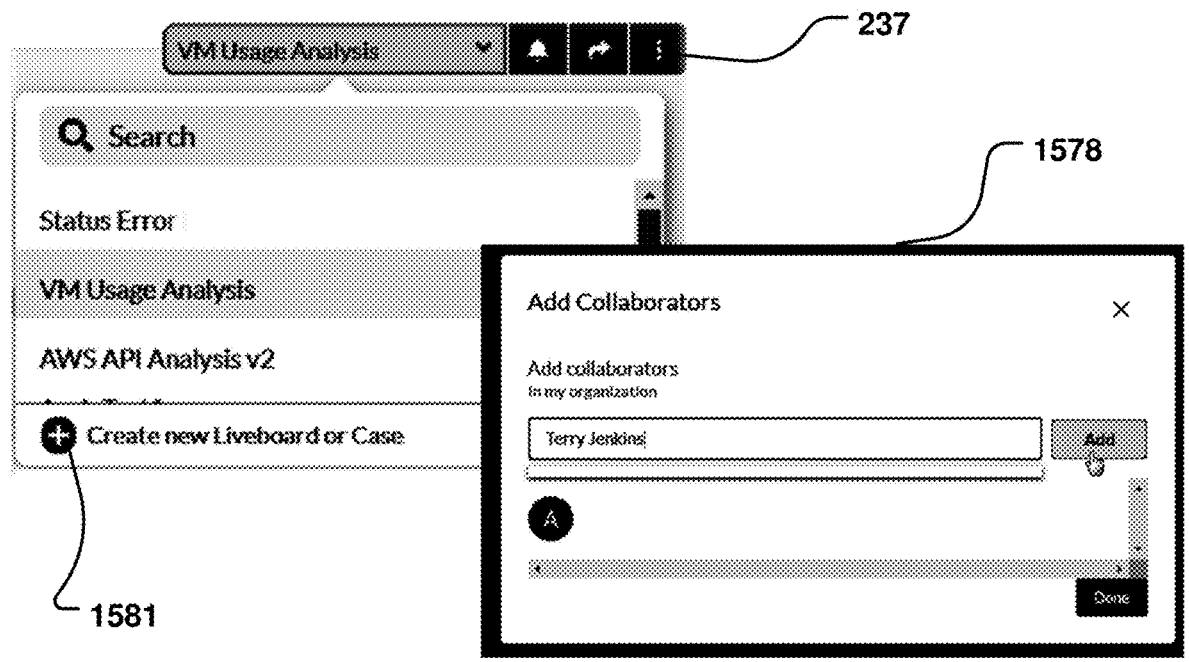
FIG.15C

State Transitions for Table-Graph 1600

| State ID 1611 | State Name | Figure | Current Table State 1615 | Current Graph State | No. of Active Data Sets | Current Statistics | New Event 1617 | Next State |
|---|---|---|---|---|---|---|---|---|
| 1 | NarrSing1 | 2, 3A-3C | Narrow | Single | One | none | Expand table | 2 |
| 2 | WideSing1 | 4 | Wide | Single | One | none | Add data set | 3 |
| 3 | WideSing2 | 5 | Wide | Single | Two | none | Add statistic (group mean) | 4 |
| 4 | WideSing2Mean | 5 | Wide | Single | Two | Group mean | Show multiple charts | 5 |
| 5 | WideMult2Mean | 6 | Wide | Multiple | Two | Group mean | Abbreviate table | 6 |
| 6 | NarrMult2Mean | 6 | Narrow | Multiple | Two | Group mean | Remove group mean | 7 |
| 7 | NarrMult2 | 6 | Narrow | Multiple | Two | none | Remove group mean | |

Fig. 16

Initial Query

| Browser Window | State Name | Figure | Current Display State | Control Selected | Event | Comment | Next Figure |
|---|---|---|---|---|---|---|---|
| Initial Query | NarrSing1 | 2 | Table=Narrow Graph=Single | Expand table | Expand table | Make the full host name visible | 4 |
| Initial Query | NarrSing1 | 3A-3C | Additional results panels for Fig. 2 | | | None | None |
| Initial Query | WideSing1 | 4 | Table=Wide Graph=Single | Row activator | Activate row | Compare second highest usage | 5 |
| Initial Query | wideSing2 | 5 | Table=Wide Graph=Single | Group mean activator | Add group mean to graph | Look at average usage for selected hosts | 6 |
| Initial Query | WideSing2Mean | 5 | Table=Wide Graph=Single | Multiple chart activator | Multiple charts | Separate the graphs to see them more clearly | 6 |
| Initial Query | WideMult2Mean | 6 | Table=Narrow Graph=Multiple (Note: table has been narrowed for convenience) | Ask about these | Follow-on Query | Ask a follow-on query to look into more detailed usage | 7 |
| Initial Query | NarrMult2Follow | 7 | Table=Narrow Graph=Multiple | Enter follow-on Query | Follow-on Query | Look at network traffic for the two selected hosts | 8 |

Fig. 17

Follow-on Query 1

| Browser Window | State Name | Figure | Current Display State | Control Selected | Event | Comment | Next Figure |
|---|---|---|---|---|---|---|---|
| Follow-on Query 1 | Bar | 8 | Bar chart = all | None | None | None | 9A Closeup of Fig. 8 |
| Follow-on Query 1 | BarSeg | 9A | Bar chart = all | Hover on bar segment | Select bar segment | Look at hosts that interact with selected host | 9B |
| Follow-on Query 1 | BarSeg | 9B | Bar chart = all | None | None | None | None |
| Follow-on Query 1 | Bar (10A) Chart (10B) Chart (10C) Table (10D) | 10A-10D | Additional results panels from follow-on Query | None | None | None | None |

Follow-on Query 2

| Browser Window | State Name | Figure | Current Display State | Control Selected | Event | Comment | Next Figure |
|---|---|---|---|---|---|---|---|
| Initial Query | WideSing2 | 11 | Table=Wide Graph=Single | Enter follow-on Query | Follow-on Query | User enters his own query as in this example. User can also select a | 12A-12B |
| Follow-on Query 2 | WideSing2 (12A) Table (12B) | 12A-12B | Results panels from follow-on Query | None | None | None | None |

Fig. 18

| Follow-on Query 3 | | | | | | | |
|---|---|---|---|---|---|---|---|
| Browser Window | State Name | Figure | Current Display State | Control Selected | Event | Comment | Next Figure |
| Initial Query | WideSing2Follow | 13 | Table=Wide Graph=Single | Enter follow-on Query | Follow-on Query | User enters his own query or selects suggestion. Create new browser window. | 14A |
| Follow-on Query 3 | NarrSing2 (14A) Table (14B) | 14A-14B | Results panels from follow-on Query | None | None | None | None |

| Liveboard | | | | | | | |
|---|---|---|---|---|---|---|---|
| Browser Window | State Name | Figure | Current Display State | Control Selected | Event | Comment | Next Figure |
| Liveboard | LiveNarrSing1 | 15A | Table=Narrow Graph=Single | None | None | None | None |
| Liveboard | LiveSummary | 15B | Various | None | None | None | None |
| Liveboard | LiveSaveCollab | 15C | Table=Narrow Graph=Single | None | None | None | None |

Fig. 19

STATE BASED GUI FOR CLOUD DATA MANAGEMENT

PRIORITY

This application is a continuation of U.S. patent application Ser. No. 17/078,022, titled "State Based GUI for Cloud Data Management," filed 22 Oct. 2020, now U.S. Pat. No. 11,444,847, issued 13 Sep. 2022 which claims the benefit of U.S. Provisional Patent Application No. 62/924,559, filed on Oct. 22, 2019, which are hereby incorporated by reference for all purposes.

RELATED APPLICATIONS

This application is related to U.S. patent application Ser. No. 15/147,113, entitled, "Natural Language Search with Semantic Mapping and Classification," filed on May 5, 2016, now U.S. Pat. No. 10,545,956, issued 28 Jan. 2020, which is hereby incorporated by reference for all purposes.

BACKGROUND

Enterprise computing is in a state of rapid transition from proprietary data storage "silos" and application environments to large scale, dynamic "cloud" computing environments in which applications and data can be moved and redeployed at will, depending on resource availability, user proximity, network latency, execution speed and many other factors.

Prior to the advent of cloud computing, organizations chose one or a few selected vendors and used those products for their enterprise computing needs. Those organizations could employ a small staff of specialists to manage these systems since they were relatively stable compared to today's dynamic cloud computing environments. This is less practical in the ever-changing cloud computing environments that enterprises are embracing today.

Another big change is that we now have far more machines generating endless streams of real time data: security devices, consumer devices like cell phones, laptops tablets, home monitoring systems, etc. This massive increase in data being generated further exacerbates the issues of managing cloud environments.

The traditional approach taken by enterprises has been based on hiring human experts trained in using vendor-supplied proprietary general-purpose tools designed for their systems. Being mostly general purpose, these tools often had no particular workflow for particular goals or problems: that was the province of the analysts specializing in using those tools.

In some cases, these tools were implemented as static dashboards. Thus, an analyst could easily spend hours on end attempting to glean useful information from them. The work itself could be tedious and mind-numbing. There is little or no flexibility in such tools and if a user needed or wanted to do anything different, he was usually required to write arcane database queries in a specialized language that accessed & retrieved the desired data. The analyst also needed to know exactly what data he wanted before writing the query.

To make sense of the results from multiple queries, an analyst would then use a different set of charting and comparison tools to integrate them so that he could view them as a whole or compare them or detect trends or to analyze them. Sharing his workflow was impractical and inefficient since it was so fragmented among so many different tools. Lastly, each analysis was often unique and not amenable to a generalized approach.

The migration to cloud computing environments has not changed this approach. Each cloud vendor stores data in its own formats using its preferred naming conventions, and provides its own proprietary tools that can do many things but, again, provides little guidance for a user. Thus, the same problems that plagued non-cloud computing environments have migrated into the cloud environment along with the migration of enterprise computing into the cloud. What's different, and most troubling to analysts and anyone else responsible for managing these environments, is that the same issues have resurfaced at a much larger scale with correspondingly greater impact.

But, what if data and applications from multiple cloud vendors could be searched, viewed, managed and compared simultaneously in an intuitive, interactive graphical user interface that presented all the information in a consistent form for easy visualization and comparison? And, what if, instead of having to learn multiple general-purpose tools that required complex queries with specialized syntax, a user could just ask queries as questions expressed in natural language similar to speaking or writing—as if asking a colleague to provide a report based on some set of underlying data? In this disclosure, we mean for questions, such as "how many", to be inclusive of imperatives, such "show me", as both forms of natural language inquiry translate directly into a database query.

An opportunity arises to depart from convention by using natural language processing to drive a responsive, dynamic and interactive graphical user interface to develop better systems and methods for managing cloud computing environments.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIG. 2 is an example of a user interface showing major components of the technologies disclosed herein.

FIGS. 3A, 3B and 3C show additional panels displayed for the query 210 shown in FIG. 2.

FIG. 15C shows how a Liveboard can be shared dynamically.

FIG. 16 shows a state transition table for the table-graph shown in FIG. 2.

FIGS. 17-19 shows a sequence of state transitions for the example workflow in FIG. 2 through FIG. 15B.

DETAILED DESCRIPTION

The following detailed description is made with reference to the figures. Sample implementations are described to illustrate the technology disclosed, not to limit its scope, which is defined by the claims. Those of ordinary skill in the art will recognize a variety of equivalent variations on the description that follows.

This disclosure describes technical challenges arising from managing and exploring the complex data from cloud computing and other heterogeneous environments. Standardization of data, improved GUI interfaces, and streamlined deployment of analysis strategy packages contribute to meeting the technical challenges.

Environment

Figure 1:
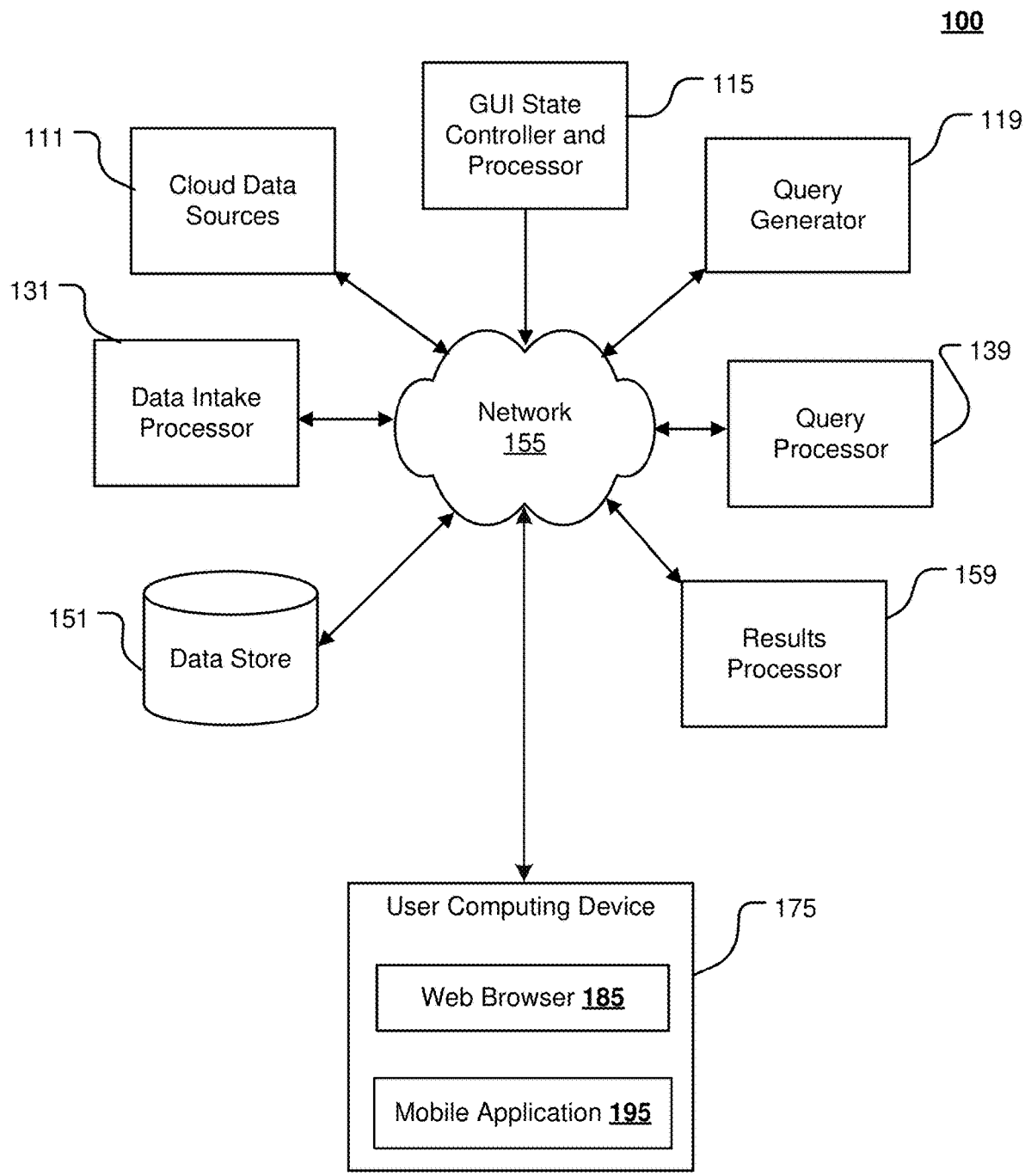
FIG. 1 illustrates one implementation that uses an interactive, real time graphical user interface (GUI) system for managing and exploring complex data in a consistent manner(?) from many different sources in cloud computing environments (the "cloud").

FIG. 1 illustrates an environment in which the technology disclosed, particularly an interactive GUI, can be used to manage and explore complex data from different sources across multiple cloud computing environments. Three of the major cloud platforms used today are Amazon Web Services (AWS), Microsoft Azure, and Google Cloud Platform (GCP).

The three major cloud platforms have their own tool suites for managing data and applications. The learning curve is steep and considerable expertise is required to master these tools, their proprietary languages, interfaces and procedures. It is technically challenging to master multiple platforms and keep straight the variations among operating systems, operating environments, interfaces, prompts and data entry requirements. Aside from interaction dynamics, the data available and schemas applied varies among the platforms. Once mastered, the tool suites present data in different ways, including different types of charts, tables and controls. Differences among tools make it difficult for organizations that migrate data and applications to multiple cloud platforms to obtain a cross-platform understanding of their usage.

One environment in which this technology can be practiced, is depicted by a high-level system diagram, FIG. 1, which includes data from cloud data sources 111, such as the three major platforms, are received via network 155 by a data intake processor 131 that normalizes incoming data and sends it to data store 151 for storage in a standardized format. The three platforms have different schemas, including different fields, different field names for similar data, and variations on data format. Character encoding also can vary. Methods of access, both via APIs and for extracting data, can also vary. This is problematic for an analysis program intended to support management and exploration of operations and security related data.

Several components are involved in an extract-transform-load pipeline that moves data from the sources 111 through the intake processor 131 to the data store 151. Normalization of incoming data into a standardized format can be accomplished using adapters configured to accept data from a source in its native format and transform it into a standardized format. A native format may use a different data model or schema in which the various data fields have a different name or syntax. As an example, many records being read by an intake processor 131 may contain a timestamp field. Depending on the schema being used, this field can be a named field like "timestamp", "date", "time", "data-time", or be unnamed and identifiable only by its position within a record. Other examples include source and destination fields for connections and packets. These fields can also go by a variety of names.

The format of data in a date-time field can vary. A particular moment can be represented as "2019-05-24 14:30:10 GMT" (2:30 pm and ten seconds on May 24, 2019 Greenwich Mean Time) or as UNIX Epoch time, which would be "1558708210" for the same moment. Epoch time is given in the number of elapsed seconds since Jan. 1, 1970 at midnight UTC/GMT. The numbers in a date-time field may be stored as individual text characters, (e.g., as in ASCII or Unicode), or as a binary integer, such as a 32 or 64 bit integer. Using this example, the Epoch time may be stored as a character string containing the ten digits "1558708210", or as its hexadecimal number equivalent: 0x5CE7FFF2. Adapters can be used to transform data to a common schema and internal formats.

For instance, data intake processor 131 can utilize adapters to accept data from many different data sources in their native formats, and transform that data into a standardized format that can be stored in a common data model accessed by natural language queries processed by query generator 119 and query processor 139. An adapter could parse the text "2019-05-24 14:30:10 GMT" using regular expressions, transform it into a ten digit UNIX Epoch text representation "1558708210" and then convert that text representation into the hex number 0x5CE7FFF2 for storage. This conversion example reduces a 23-character text string to a four-byte integer.

Transforming incoming data into a standardized format simplifies code maintenance. One code base, instead of multiple code bases can be used instead of deploying code to each platform, with different schemas or data models, all of which are subject to continual change and updating to accommodate new features and bug fixes. Yet, another advantage is that natural language queries applied to data from one platform can immediately be applied to other platforms after adapters have standardized data formats and data models.

Alternatively, a single code base can recognize and dynamically normalize data from multiple platforms by generating platform-specific queries. Or, separate code can be invoked for each platform. When a query returns data from multiple platforms, the returned data can be standardized and merged for display.

In the system diagram, a GUI state controller 115 manages displays and presentation of output from results processor 159, responsive to queries and controls selected from a user computing device 175. The interactive GUI can present these results in a web browser 185 or a mobile application 195, running on a user computing device such as a cell phone, tablet computer, laptop, desktop, workstation, etc.

Query generator 119 interacts with natural language user input to provide queries for processing by a query processor 139 that retrieves responsive data from data store 151. The results processor 159 processes responsive data for display on the user computing device 175. Processing can include transformation of data by aggregation, statistical analysis including averages and ranges, reordering or grouping into data sets based on specific characteristics of the data (e.g. grouping based on IP addresses or host names), pattern analysis, anomaly and outlier identification, generation of alerts and notifications based on the data processing, and other operations. These operations can include transforming or converting results into formats appropriate for use in different visualizations: again, using the date-time example above, in some cases a text representation may be more appropriate than a numeric representation as an integer. Thus, a retrieved value may require conversion to be properly displayed. Further, these operations can also include performing joins and filtering of results obtained from separate queries in order to present them in a visualization appropriate for a particular natural language question.

In some implementations, the modules of the environment for the technology disclosed herein as exemplified in FIG. 1 can be of varying types including workstations, servers, computing clusters, blade servers, server farms, or any other data processing systems or computing devices. Modules can be communicably coupled to the data store via a different network connection. For example, item data store 131 can be coupled to a direct network link. In some implementations, it may be connected via a WiFi link or hotspot.

In some implementations, network(s) 155 can be any one or any combination of Local Area Network (LAN), Wide Area Network (WAN), WiFi, WiMAX, telephone network, wireless network, point-to-point network, star network, token ring network, hub network, peer-to-peer connections like Bluetooth, Near Field Communication (NFC), Z-Wave, ZigBee, or other appropriate configuration of data networks, including the Internet.

User computing device 175 includes a web browser 185 and/or a mobile application 195. In some implementations, user computing device 175 can be a personal computer, laptop computer, tablet computer, smartphone, personal digital assistant (PDA), digital image capture devices, and the like.

In some implementations, datastores can store information from one or more tenants into tables of a common database image to form an on-demand database service (ODDS), which can be implemented in many ways, such as a multi-tenant database system (MTDS). A database image can include one or more database objects. In other implementations, the databases can be relational database management systems (RDBMSs), object-oriented database management systems (OODBMSs), distributed file systems (DFS), no-schema database, or any other data storing systems or computing devices. other data storing systems or computing devices.

User Interface Components

The technology disclosed helps address the problem of understanding data from multiple cloud platforms, as well as from a single platform. It provides an interactive GUI driven by natural language queries, formulated as either requests or questions, and intuitive controls that support drill-down and follow-up queries. One such feature is a table-graph that links responsive series of data to graph elements. Individual rows of data in the table can be selected or deselected for display. The rows can be displayed in a single graph or individual graphs. Averages and other statistical measures can be calculated and graphed responsive to selectable controls, without formulas for series calculations.

Follow-up queries are a particularly powerful feature of the interactive GUI. As used in this disclosure, the term question can also include a query that is entered as an imperative request. Various controls call up suggested follow-up queries. One or more suggested queries can be run and viewed, within the context of selected data rows. This combination of the interactive GUI and the follow-up queries allows a user to quickly visualize and explore relationships among data from multiple platforms and sources common to the platforms.

In sections that follow, we provide two use cases that illustrate how an operations analyst can use our interactive GUI to review CPU usage and perform other analyses. Before turning to the use cases, we identify controls and panels of the interactive GUI and explain how they work.

FIGS. 2-6 depict views of data responsive to database queries derived from the natural language question, "Which VM instances across all regions and availability zones are using the most CPU resources per day over the past 60 days?" This question has both operational and security implications. Several database queries return useful views of the data. This natural language question can also be phrased as a request: "Show me VM instances across all regions and availability zones are using the most CPU resources per day over the past 60 days."

FIGS. 2 and 3A-C collectively show four display panels that can be arranged on a single web page, with data responsive to the CPU resources query. For instance, FIG. 2 can be above the fold and FIGS. 3A-C can be below the fold, accessible by scrolling beyond the material above the fold that is initially visible. Alternatively, these displays could be on separate pages linked by a next button or similar control, or they could be on separate browser tabs. The example displays present responsive data organized in one or more data objects and controls to change the appearance of data or the data displayed.

Figure 2:
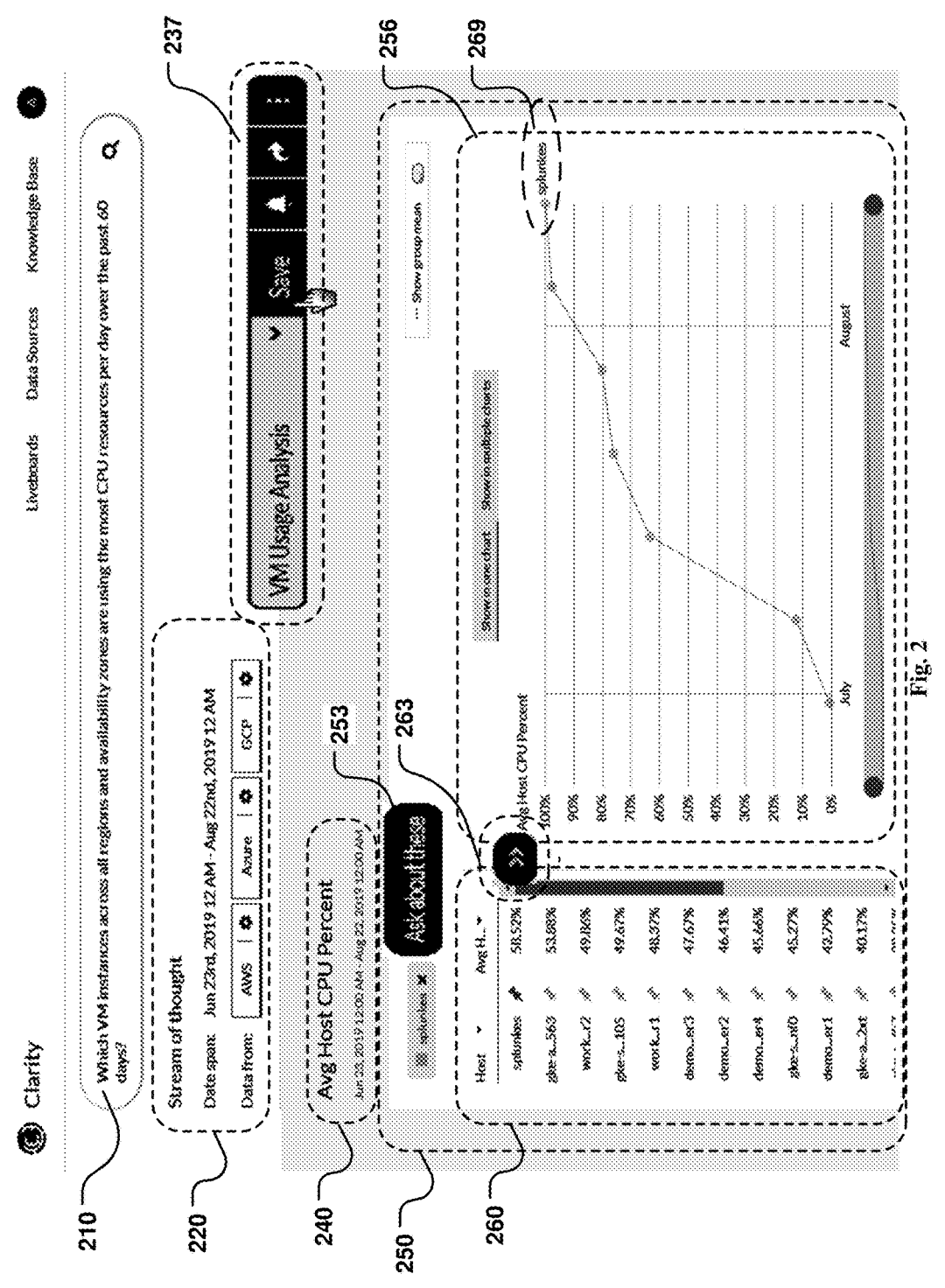

FIG. 2 shows a first answer to the natural language question, in terms of average host CPU percent. A query display window 210 displays the user's query in natural language, phrased as if one person was asking another to answer the query or provide information. The date range (span) for the information and the data sources queried are given in 220. Analysis controls 237 include an analysis name, save, schedule, share and additional controls. The first answer, which includes panels 240 and 250, is given a title and data range in 240. A table-graph 250 includes a table 260 and a graph or chart 256, in panels or subpanels.

Interactive controls of FIG. 2 can be used to dynamically change graphed data in the table-graph, as further explained below in discussions of FIGS. 4-5. The table 260 can be made narrower or wider using control 253, to allow more space for graphs or easier reading of labels in the table. Individual rows can be selected for graphing, such as the row for host "splunkes", using a push-pin selection control, which controls the data graphed. Generally, a table-graph exposes multiple rows of data sets, such as time series, in a table. The user selects only those rows of interest for display in the graph. Immediate, real time interaction between selection of rows in the table and appearance of elements in the graph makes it intuitive and efficient for a user to evaluate and compare multiple complex data sets from cloud computing platforms.

Variations on the panels in illustrated in FIG. 2 are available. A natural language query can be selected from a list or generated from user input. For example, keywords and phrases can be used to present predefined queries or generate new ones. In another implementation, a user can enter a query directly or enter a few descriptive words and select from a suggested or auto completion list. The phrase "CPU resources" could be mapped to the natural language query 210 and also to one or more database queries in a specific database query language. Alternatively, a user could enter database queries in a specific database query language like SQL (structured query language) and continue to take advantage of aspects of the interactive GUI disclosed to drill down into results. A natural language query 210 can be transformed by query processor 139 into multiple queries used to access the data store 151, producing multiple panels of displayed results. Additionally, a human readable version of the multiple queries could be provided, for instance in a database query language like SQL, elaborating on the natural language query and explaining how the natural language has been operationalized in database queries. Data sets can be displayed on a single chart or on multiple individual graphs 558. Statistical information can be added to a graph 549 and 569. Filters can be applied 541, and so forth.

For one method of converting a natural language question into an executable database query, see the co-pending application by this team, Natural Language Search with Semantic Mapping and Classification, app. Ser. No. 15/147,113 filed May 5, 2016, which is hereby incorporated by reference. The co-pending application discloses a way to convert user queries into one or more database queries that can be used to retrieve data from data store 151.

FIGS. 3A thru 3C show additional answers to the natural language question, in terms of host availability zones by average CPU percent 310, top host regions by average CPU percent 330, and host metrics 370. These additional answers help a user to answer their natural language question. Separate panels are used to display information from multiple database queries spawned from the natural language question. The panels can appear in one web browser window, accessible by scrolling, in different browser tabs, stacked side-by-side, overlapped, or accessible via on-screen controls.

Each panel can provide additional context information, including a title and date range information 240 for the data on that panel. Controls can be provided to save the panel for future use or sharing as exemplified by 237, and to ask a follow-up query about data displayed on the panel as shown by 253.

Most data generated in cloud environments is time-stamped, with a date and time of creation. Thus, cloud data lends itself to presentation as a time series, as shown in graph 256. Alternatively, data sets can be compared against each other without explicitly using timestamps, for instance by looking at which sources communicate with which destinations and vice versa as in FIG. 9A and FIG. 9B.

The row selection controls assist a user who is comparing sets of data. Many data sets are presented, as rows in a table (tabular form) 260. Selected rows appear as elements in the adjacent a graph 256, linked by the table-graph. The table-graph links tabular data to its graphical display, dynamically and interactively, so that changes made to selections from the table are immediately or soon reflected in its representation as a graph or chart. The table and chart are in close proximity, so a user can view them simultaneously and correlate selected rows with elements in the graph.

Suppose that a user suspects that two rows of data sets interact in a particular way. The user can quickly verify her intuition visually by selecting two data sets from the table and immediately seeing the resulting graph, updated or generated quickly and positioned nearby. The user looks at the updated graph to spot any interaction pattern. FIGS. 5-6 illustrate two selected rows, alternatively presented in a single graph and side-by-side. This example reinforces how, using a table-graph, data sets listed in the table 260 can be dynamically added to and removed from the graph 256 by selecting or deselecting controls associated with rows, as illustrated in FIG. 4.

Figure 4:
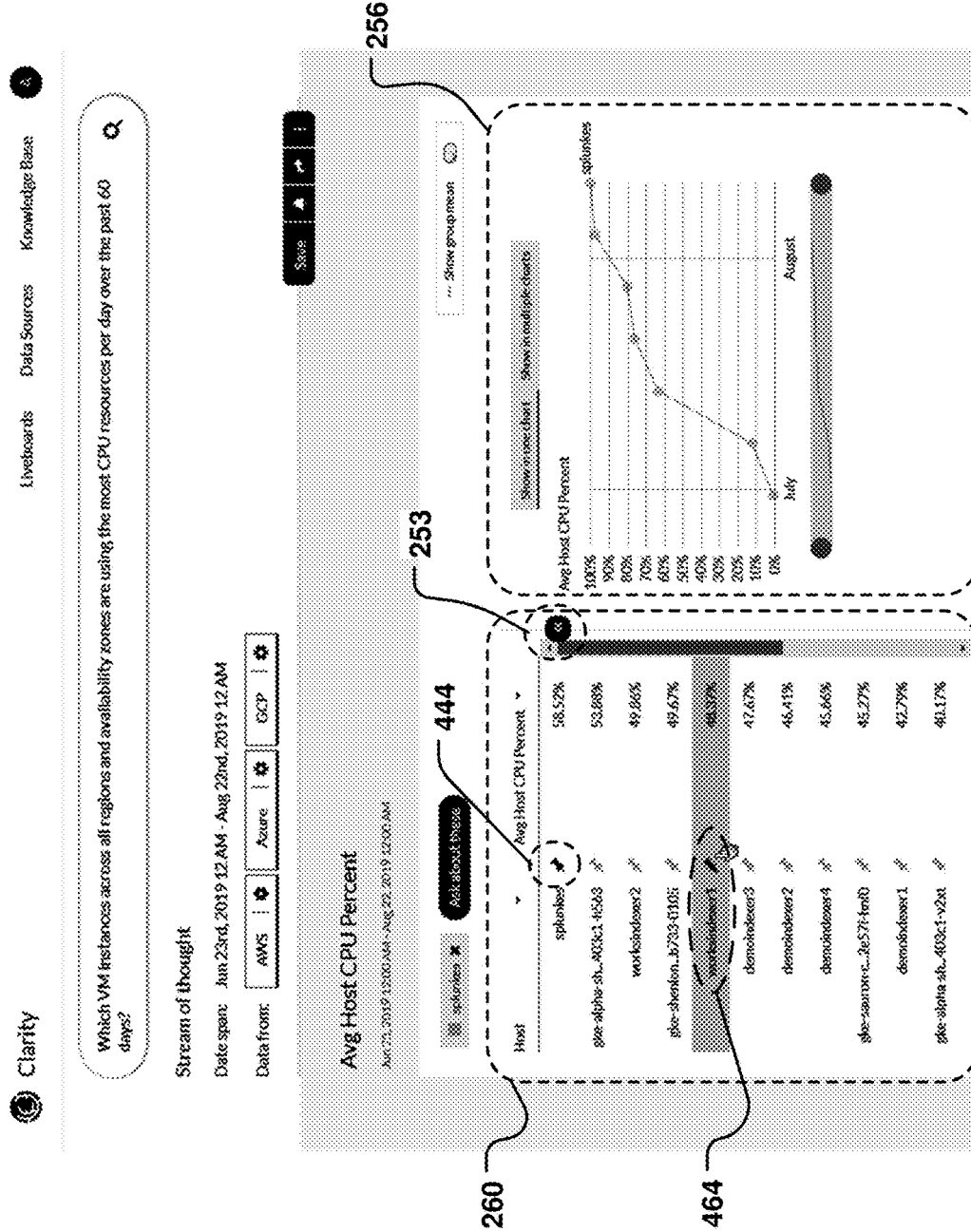
FIG. 4 shows dynamic aspects of a table-graph when various of its controls are activated.

FIG. 4 shows selecting a second row in the table-graph, using a push-pin control icon. Several data sets are shown in table 260. Each has an "activate" control, shown in this example as a pushpin that changes color when selected. Many variations for the icon or shape of this control are possible, and in some implementations this control may be replaced by highlighting the text that describes each data set. Before selection of "worksindexer1" 464, only one data set "splunkes" 444 is displayed on graph 256. When a data set display control 464 in column 444 is selected, a corresponding data set "worksindexer1" 464 is added to the graph 256, as shown in FIG. 5. The selected row 464 is moved in FIG. 5 towards the top of the table 260.

Figure 5:
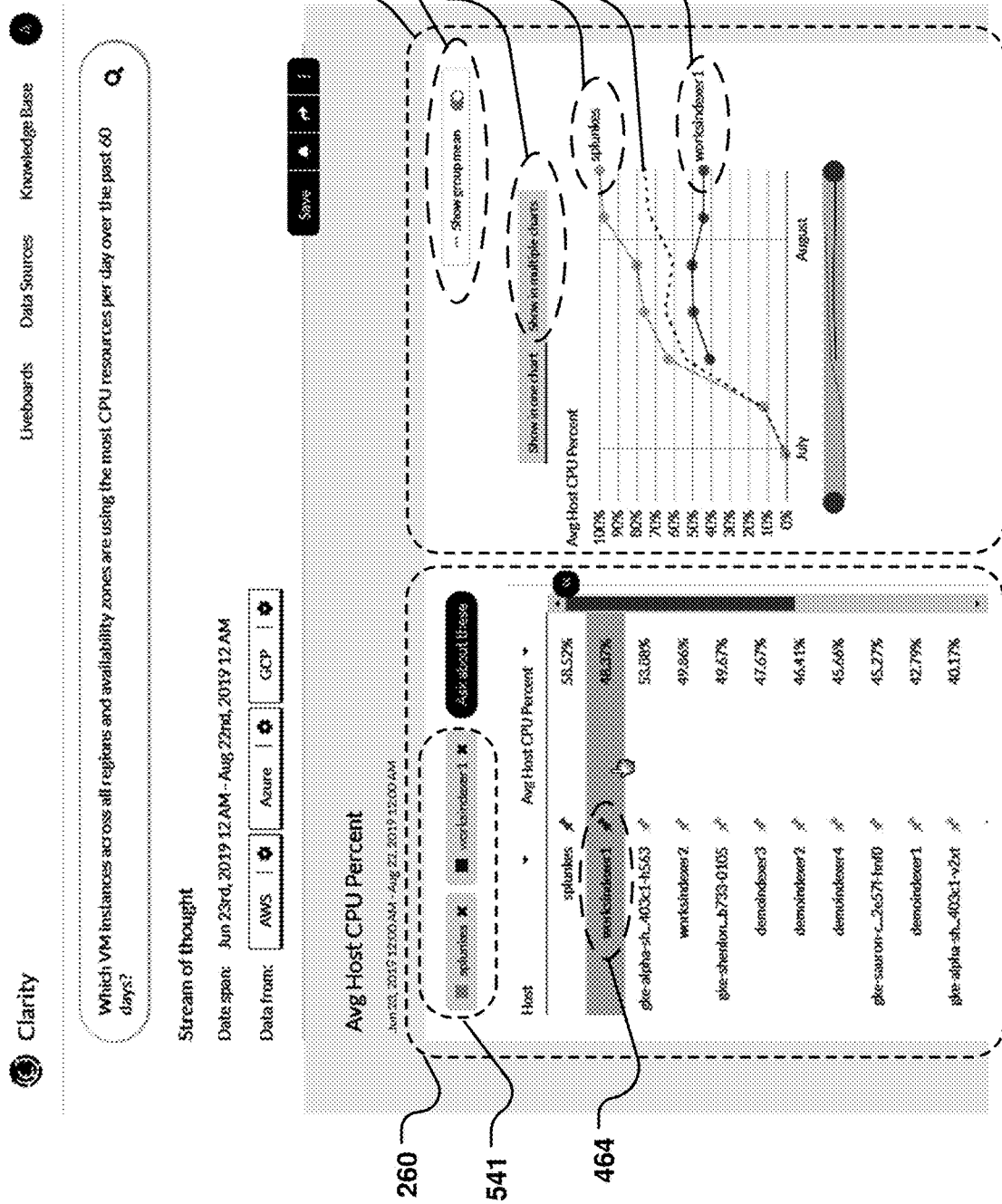
FIG. 5 shows examples of changes in a table-graph for the technology disclosed.
Figure 6:
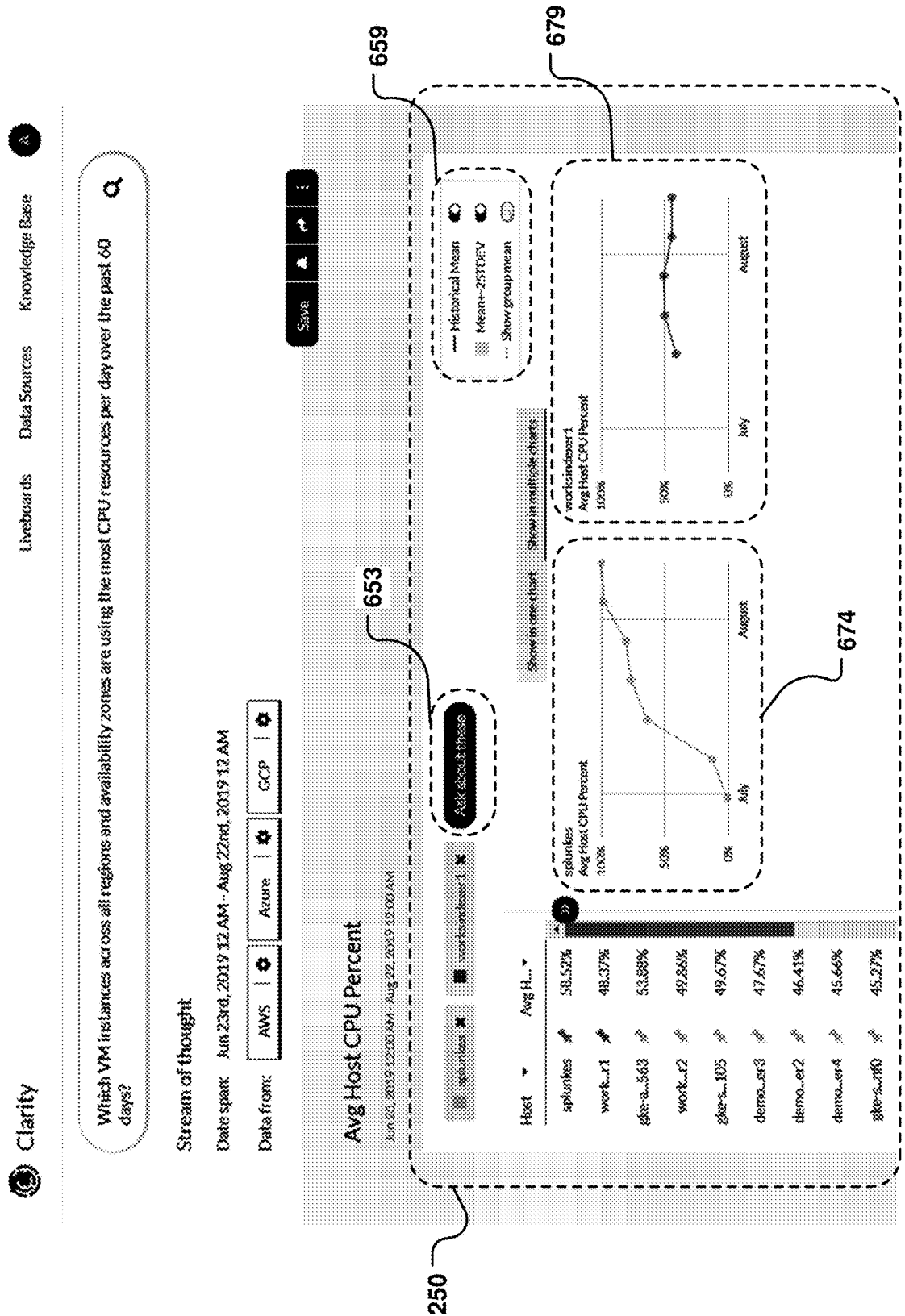
FIG. 6 show an example of comparing two data sets simultaneously using a table-graph.

FIG. 5 shows the selected row 464 moved towards the top of the table and added to the graph with a corresponding legend 579. To make comparisons easier, the rows can be ordered, for instance based on its measurement value, with respect to other selected data sets. The technology disclosed includes automatically reordering and regrouping selected rows of information. This makes it easier for a user to see and isolate particular relationships among selected data sets.

Although graph 256 is shown in many of the figures with a line connecting sample measurements, many different visualizations can be used. For instance, connecting lines may be omitted, the area beneath the line may be filled in, and each sample may have a vertical bar underneath it like a vertical bar chart. Many alternative chart styles will be known to those skilled in the art.

Additional controls can adjust the display to enhance readability and visual comprehension. For instance, the initial display shown in FIG. 2 includes a toggle table width control 263 used to widen or narrow the width of the table. The initial display shown makes more room for the graph 269 by narrowing table 260 and abbreviating the text descriptions on each row. The wide table version is shown in FIG. 4. Several alternatives are available to control table width.

Redundant controls can be provided for the selected data sets such as list 541 in FIG. 5 of currently selected rows for "splunkes" and "worksindexer1". This version of redundant controls includes an "X" control for each data set name. Selecting an "X" removes that data set from the graph.

FIG. 5 also shows a group mean control 549 to calculate the mean value of the data displayed. In this example, the calculated mean value is displayed as a dotted line 569. Averages and other statistical measures can be calculated and graphed responsive to selectable controls, without formulas for series calculations. A multiple chart control 558 allows a user to separate out each data set into its own smaller graph.

FIG. 6 shows multiple charts of smaller, individual graphs for selected data sets. Other layouts are available that that keep individual graphs close enough together for a user to see them simultaneously or with minimal scrolling. Data sets "splunkes" and "worksindexer1" appear in this example as smaller graphs 674, 679. Other real time controls 659 are shown, including historical mean, mean range plus or minus two standard deviations, and group mean. These are statistical calculations that can be selected and applied using controls instead of formulas.

FIG. 6 shows a follow-up query control 653 labeled "Ask about these" positioned next to the list 541. This control allows a user to obtain suggested follow-up queries about the listed data sets.

FIGS. 7-13 depict follow-up queries, after the natural language question, "Which VM instances across all regions and availability zones are using the most CPU resources per day over the past 60 days?" Follow-up queries can begin with suggested queries in a pop-out panel.

Suggested queries can be generated based on previous queries. For instance, in main query 710 in FIG. 7, the query keywords "VM instances" and "CPU resources" could be mapped to one or more associated queries. These associated queries can be obtained by examining previously saved query threads. By correlating the occurrence of keywords "VM instances" and "CPU resources" found in the saved query threads with subsequent queries in these threads and ranking them, for instance by frequency of occurrence, associated queries can be found. These associated queries can then be used as suggested queries when keywords "VM instances" and "CPU resources" are found in a user's current query. Alternatively, rather than display a suggested query in its entirety, one or more keywords can be extracted and displayed. For instance, in this example, "traffic" would be a keyword associated with CPU resource usage, since network traffic utilizes both source and destination computing resources.

In other implementations, a natural language processor can map keywords to concepts and use related concepts to generate suggestions. Again, maintaining the current example, keyword "CPU resources" can be mapped to concept "computing resources" and this term can be assigned a high correlation with other concepts and their associated keywords like "traffic", "network traffic", "storage", "storage metrics", and so forth. The keywords can be displayed standalone as shown in popup panel 739 of FIG. 7, as they would be meaningful to a network, systems or data analyst. In other implementations they can be used to find and display previous queries that use them.

In yet other implementations, natural language processing can be used to generate queries using relevant keywords or concepts, for instance like this: "Show me storage metrics for all hosts for the last 60 days." In this case, natural language processing could have extracted data for the time range "last 60 days" based on a user's previous query thread, i.e., the sequence of queries the user recently entered.

Figure 7:
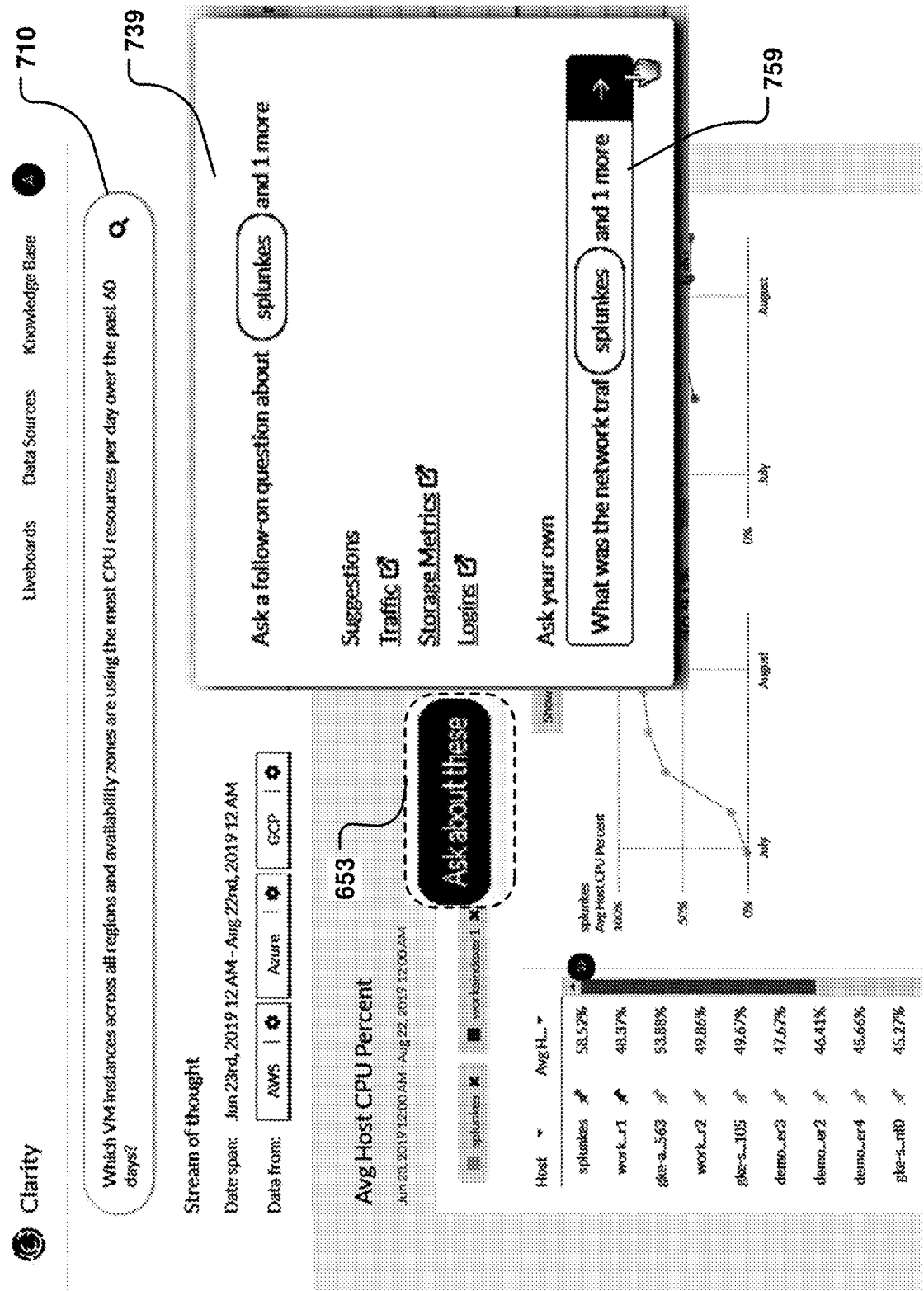
FIG. 7 shows a popup window for a first follow-up query 710.

FIG. 7 shows pop-out panel 739 with suggested queries for traffic, storage metrics and logins, invoked by activating the follow-up query control 653. Partially visible in the free text entry area 759, a follow-up question was entered, "What was the network traffic by host per day over the past 60 days?" This follow-up question is answered, within the context of selected rows "splunkes" and "worksindexer1", in the following figures. Context is carried forward because this is a follow-up query.

FIGS. 8 and 10A-D collectively show five display panels and variations, which can be arranged as in FIGS. 2 and 3A-C, with data responsive to the follow-up network traffic question.

Figure 8:
FIGS. 8, 9A and 9B illustrate how segments of a horizontal bar chart can be selected by "hovering" a cursor.

FIG. 8 displays one answer to the network traffic question in terms of destination hosts from source hosts, using a horizontal stacked bar graph, instead of a table-graph. The follow-up natural language question and the selected rows context are displayed together 801. As in prior figures, a time period of data and data source appear below the query window 801. Below that, an analysis panel appears with analysis controls. As with the selected row list 541, "X" controls appear next to the two selected hosts, which can be used to remove individual hosts from the selected data sets.

Figure 9A:
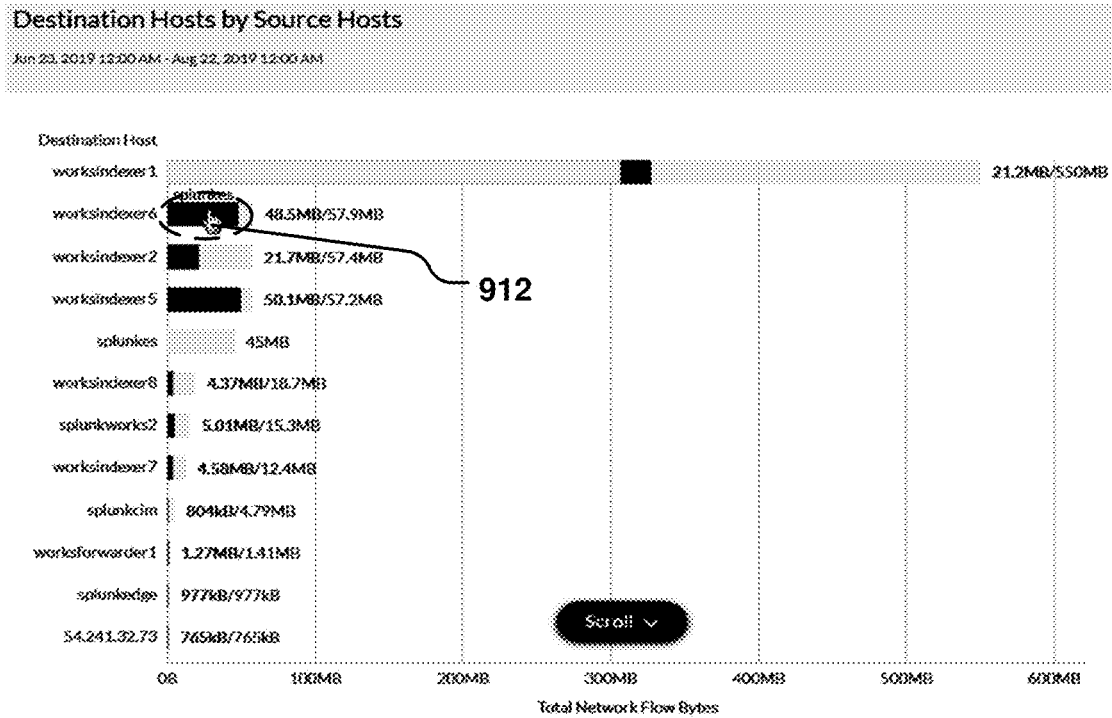
Figure 9B:
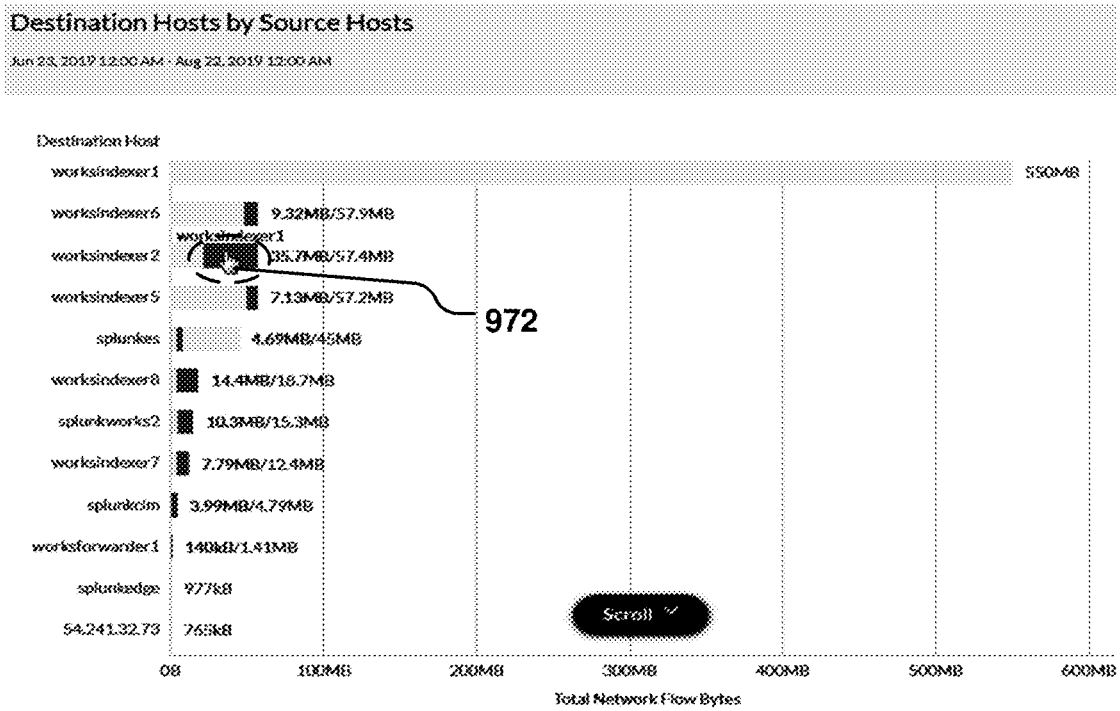

FIG. 9A-B are variations on FIG. 8 that show enhanced contrast display of two selected segments, respectively, within the stacked bar graph. The data shown is organized with rows of destination hosts and stacked bars of source hosts. Hovering a cursor over a source host segment within a bar increases contrast between the selected a source host segment, such as "splunkes" 912, in the bar for destination host "worksindexer6" and in bars for other destination hosts. Contrast can be increased by emphasis on the selected segment and/or de-emphasis of non-selected segments. The style of emphasis or contrast will depend on coding or coloring of the stacked bar, prior to selection. In FIG. 9A, six destination bars have selected segments corresponding to the selected source host "splunkes". The destination host bars that include the selected segment include "worksindexer1", "worksindexer6", "worksindexer2", "worksindexer8", "splunkworks2", and"worksindexer7". A user may infer, from the graphed segments, that these six hosts interact with the host "splunkes", from presence of the "splunkes" segment on the respective bars. In FIG. 9B, eight destination hosts interact with source host "worksindexer2", including "worksindexer6", "worksindexer2", "worksindexer5", "splunkes", "worksindexer8", "splunkworks2", "splunkcim" and "worksforwarder1".

Enhanced contrast display of selected segments is not limited to stacked horizontal bar graphs. It can be applied vertical bar graphs, pie charts, donut graphs and the like.

Figure 10A:
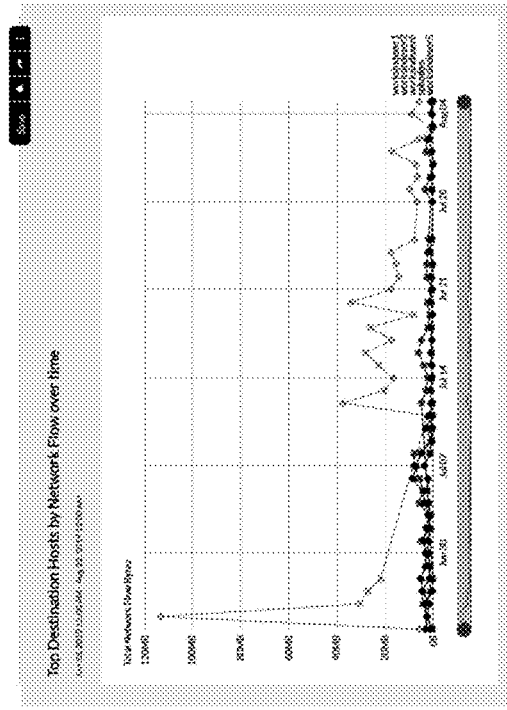
FIGS. 10A, 10B, 10C and 10D show additional panels displayed for the query 710 shown in FIG. 7.
Figure 10B:
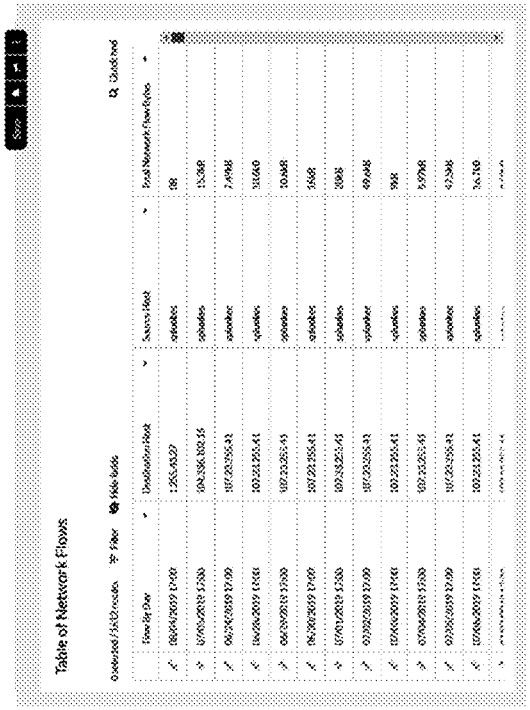
Figure 10C:
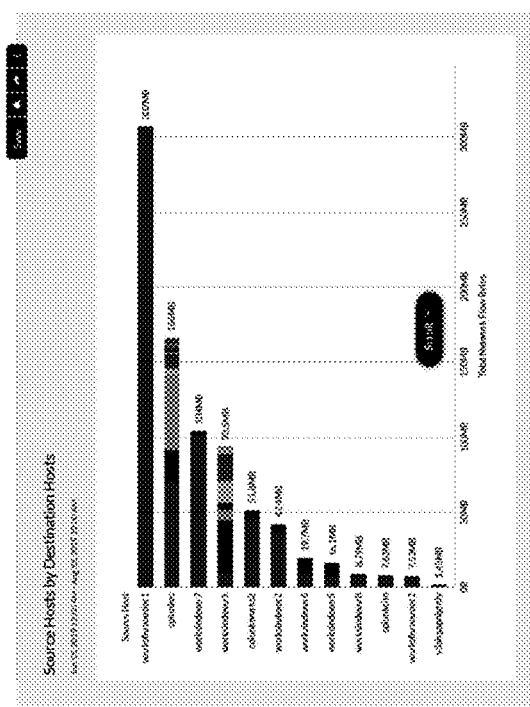
Figure 10D:
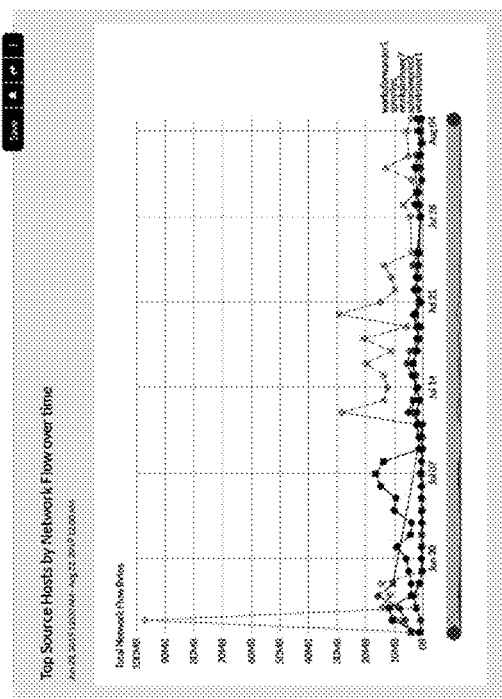

FIGS. 10A-D show additional answers to the natural language question, in terms of source hosts by destination hosts (FIG. 10A), destination hosts by network flow over time (FIG. 10B), source hosts by network flow over time (FIG. 10C) and a table of network flows (FIG. 10D). These additional answers help the user answer the follow-up question or query. Each chart is shown on a separate panel that can be saved for future use or sharing via a save control 237, described in the discussion of FIG. 2. As described above, FIGS. 10A-D can be accessible on the same web page as FIG. 8 by scrolling beyond the material above the fold that is initially visible. Alternatively, these displays could be on separate pages linked by a next button or similar control, or they could be on separate browser tabs.

Figure 11:
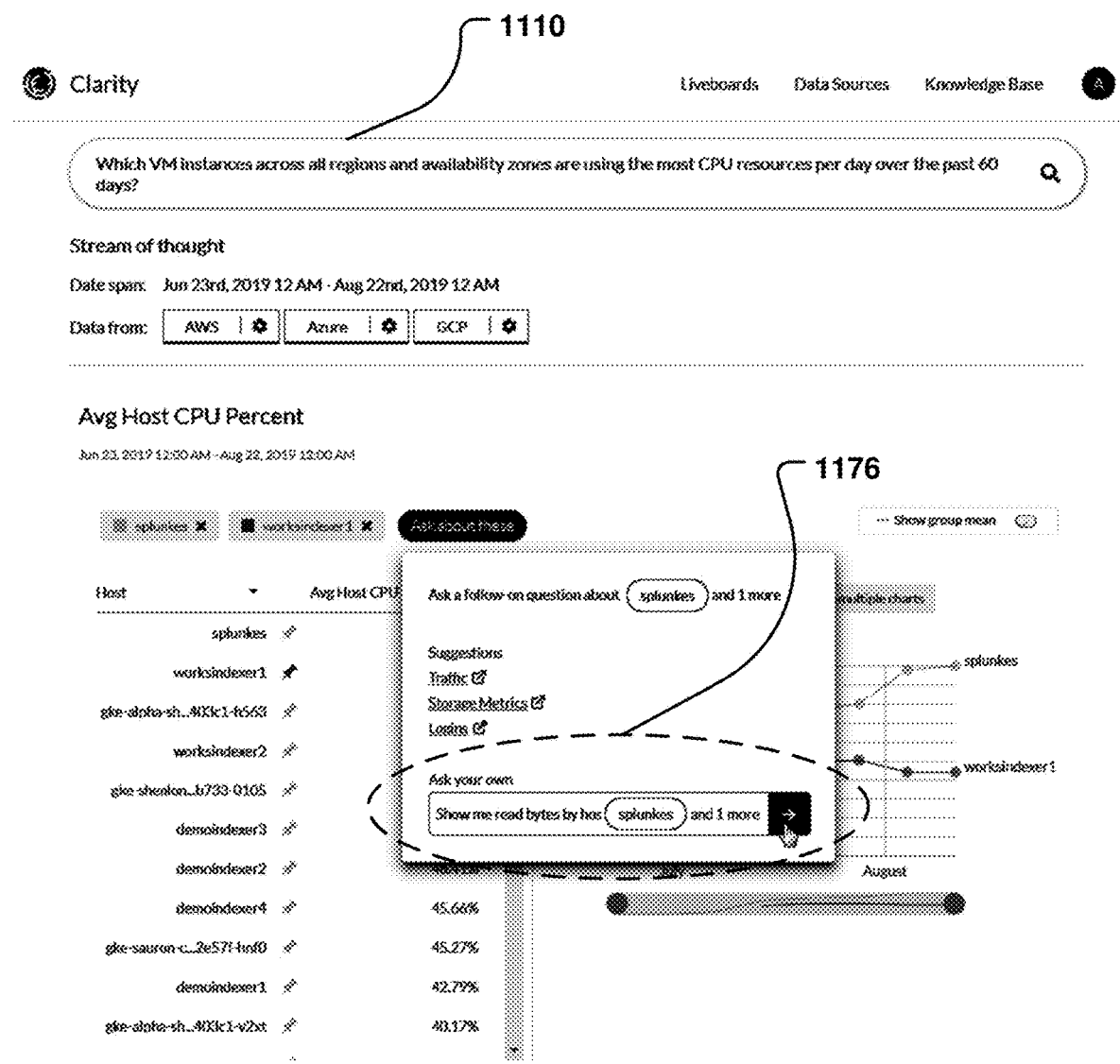
FIG. 11 shows a popup panel for a second follow-up query 1110.
Figures 12A, 12B:
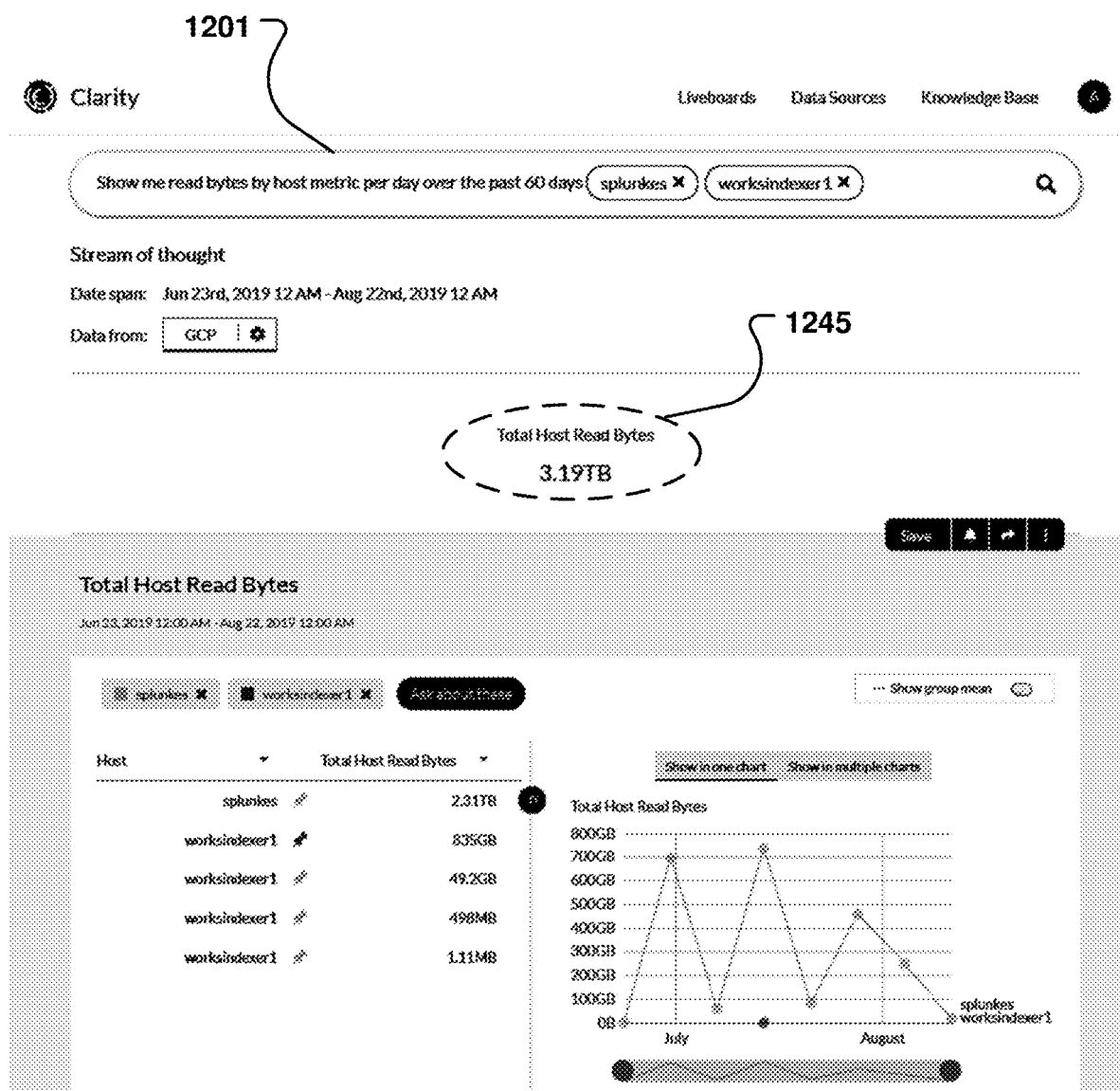
FIGS. 12A and 12B show the resulting panels displayed for the follow-up query 1110 in FIG. 11.

FIGS. 11 and 12A-B show another follow-up question and two answer panels. FIG. 11 shows pop-out panel 1176 with suggested queries for traffic, storage metrics and logins, invoked by activating the "ask about these" or a similar control. Partially visible in the free text entry area 1176, a follow-up question was entered as an imperative request, "Show me read bytes by host metric per day over the past 60 days" This follow-up question is answered within the context of selected rows "splunkes" and "worksindexer1", in the FIGS. 12A-B. This context appears in free text entry area 1176. Context is carried forward because this is a follow-up query. Aggregate results 1245 appear below the follow-up query 1201. FIG. 12A includes a table-graph and FIG. 12B a table of metrics without any graph.

Figure 13:
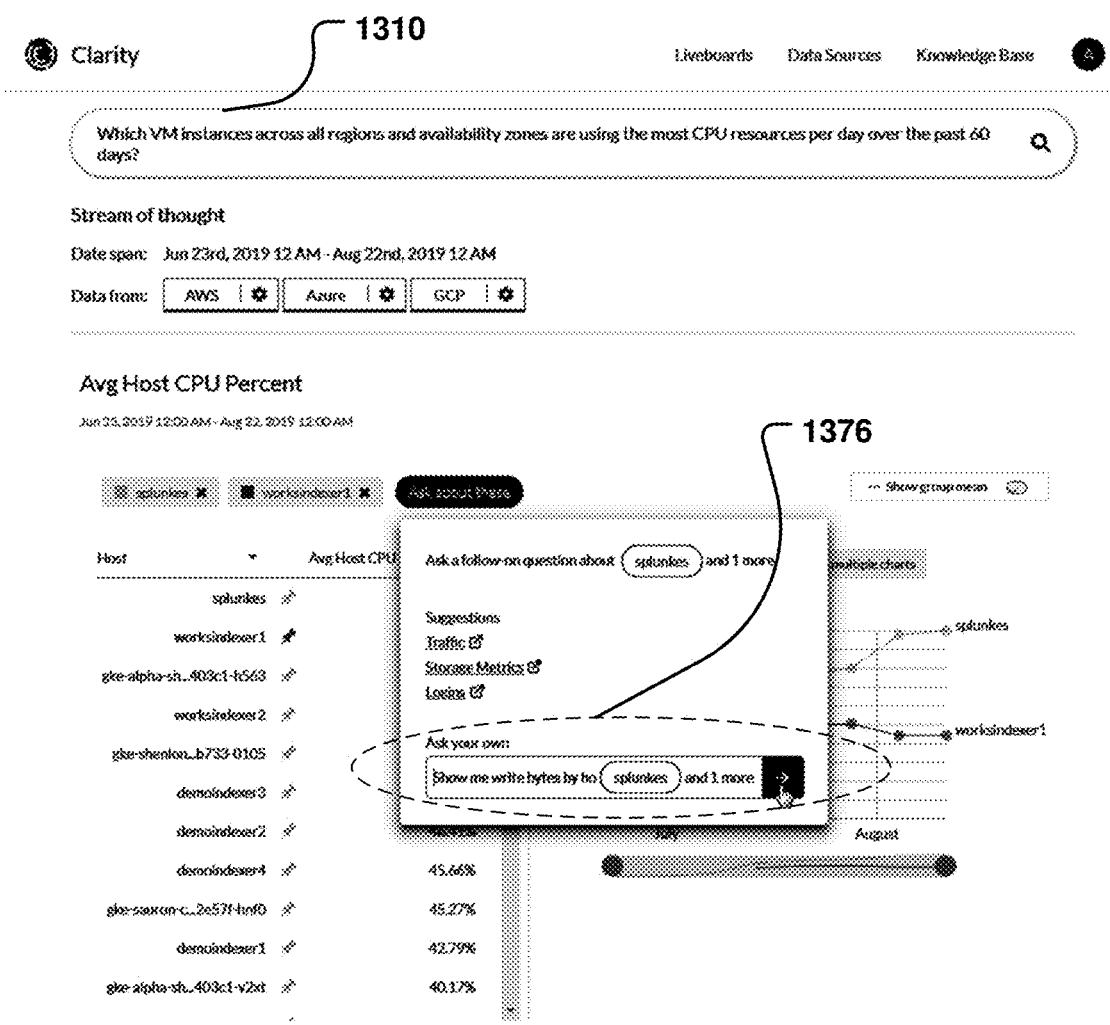
FIG. 13 shows a popup window for a third follow-up query 1310.
Figures 14A, 14B:
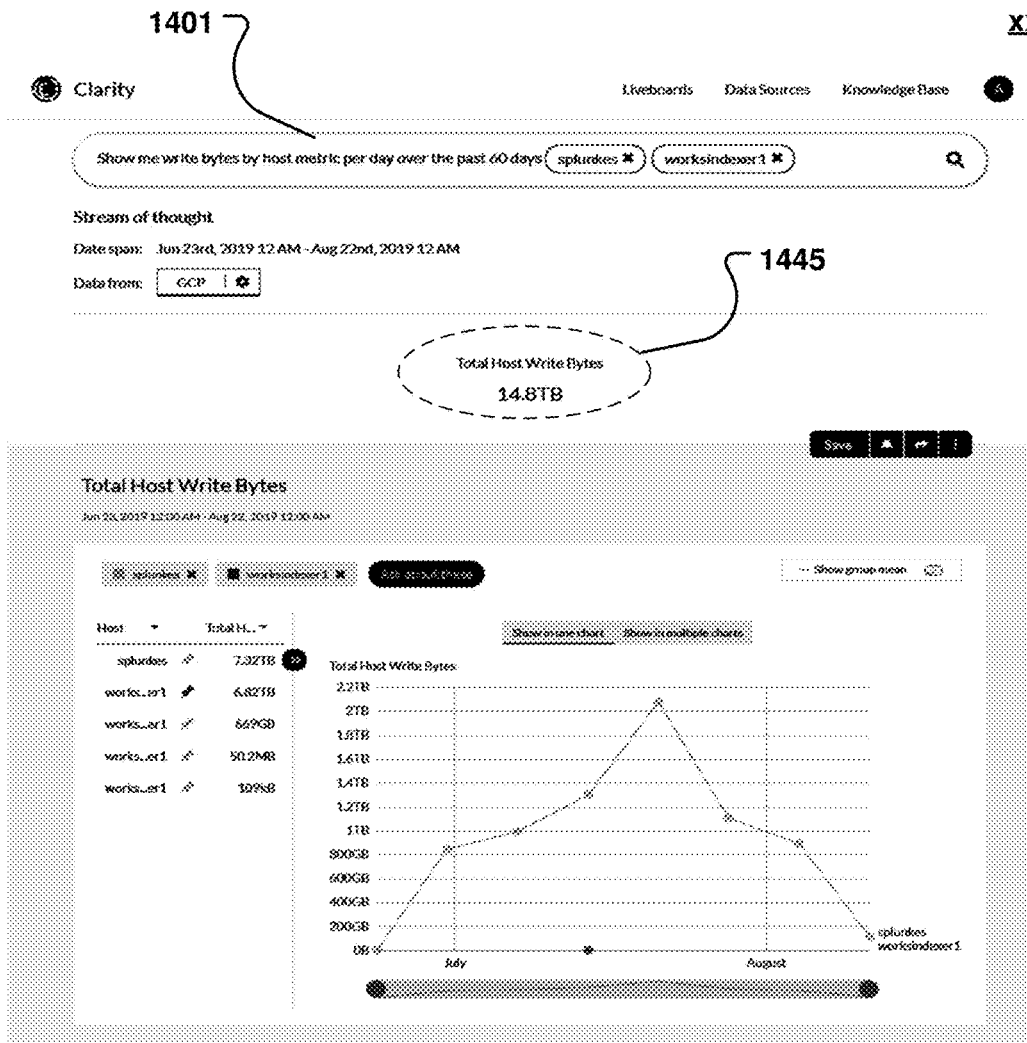
FIGS. 14A and 14B show the resulting panels displayed for the follow-up query 1310 in FIG. 13.

FIGS. 13 and 14A-B return to the query in FIGS. 6-7 and two rows selected context, with another example follow-up query 1376 based on previous query 710 (shown as 1310 in this figure). FIG. 13 that shows pop-out panel 1376 with suggested queries for traffic, storage metrics and logins, again invoked by activating the "ask about these" or a similar control. Partially visible in the free text entry area 1376, a follow-up question was entered, "Show me write bytes by host metric per day over the past 60 days". Answers appear in the following pair of figures.

FIG. 14A and FIG. 14B show the query 1401 and aggregate results 1445. Additional results follow. These displays are similar to those in FIGS. 12A-12B, and show a table-graph displaying host write bytes and a table of host metrics, respectively. Again, this follow-up question is answered within the context of selected rows "splunkes" and "worksindexer1", and answers appear in the FIGS. 12A-B. Context is carried forward because this is a follow-up query. This completes identification of controls and panels of FIGS. 2-14, so we turn to the first use case.

Use Case 1: CPU Resource Analysis

Most enterprises utilizing a cloud computing environment have a continuing need to monitor their computing resources. Performance optimization, security monitoring, resource availability, dynamic provisioning and load management are just some of the many network operations issues facing analysts, system administrators, site reliability engineers, security engineers and others responsible for managing cloud environments. These environments are designed to provide access to a dynamically configurable and scalable pool of servers, storage, applications and other services running on networks that can be located anywhere there is connectivity locally or via the internet.

FIGS. 5-14B are screen captures of how an analyst might utilize the disclosed technology to track down particular hosts that are using more computing resources as compared to other hosts. These figures are driven by a series comprising one main query and three follow-up queries.

In the initial query, the analyst looks at the big picture by asking:

Which VM instances across all regions are using the most CPU resources per day over the past 60 days? (FIGS. 5-6)

The main result from this query is shown in FIG. 5 as a table-graph with a single chart, and in FIG. 6 as a table-graph with multiple charts.

Follow-up queries look into the network traffic for each host can reveal a further detail. A follow-up query that is offered in the first panel of the initial query results 759, in pop-out panel 739 of FIG. 7:

What was the network traffic by host per day over the past 60 days? (FIGS. 7-10D)

The main result of this query is shown in FIG. 8.

Then, FIGS. 9A and 9B show how a user would dynamically select the relationship between one particular host and other hosts. Hovering on a segment of a bar, wherein the segment corresponds to the host, is one implementation that can be used to select the particular host. The above descriptions for FIGS. 9A and 9B explain this in more detail.

FIGS. 10A-10D are additional panels resulting from follow-up query 801. These can be displayed sequentially as part of a scrolling web page, on separate web browser tabs, and in other ways that maintain an association among them as responding to a particular query.

To expose further detail, two follow-up queries can examine bytes read and written to each host:

Show me read bytes by host metric per day over the past 60 days. (FIGS. 11-12B)

The query from the pop out panel 1176 in FIG. 11 displays the follow-up_query 1201 and its results as a table-graph in FIG. 12A, followed by a table in FIG. 12B. The total bytes read by the host were 3.19 terabytes as in aggregate results 1245:

Show me write bytes by host metric per day over the past 60 days. (FIGS. 13-14B)

Similar to the previous follow-up query 1176, the query from the pop out panel 1376 in FIG. 13 displays its results as a table-graph in FIG. 14A, followed by a table in FIG. 14B. The total bytes read by the host were 14.8 terabytes as in aggregate results 1445.

FIG. 2 exemplifies a base image that displays the results of the initial query 210 about CPU resource usage. The table-graph shows available data sets in the table 260 and the one with the most CPU usage in the graph 269. Other information 310, 330 and 370 is shown in FIG. 3A through FIG. 3C, should an analyst be interested in looking at host availability in a particular zone 310, usage of top host region 330, or investigating detailed host metrics 370.

For this example, however, the workflow requires changing the state of the base image in FIG. 2 to display full host names via table width toggle control 263, then choosing another host for comparison 464 by selecting it as in FIG. 4.

FIG. 5 shows the resulting state transition in the base image: host "worksindexer1" has been selected 464 and repositioned at the top of the table in descending order of average host CPU percent utilization. Simultaneous with this repositioning, a new set of connected points has been drawn on the graph 256 and labeled with a corresponding legend 579. Additionally, to get a sense of what an average set of values might be, the group mean control 549 has been activated, resulting in dotted line 569. The state of the image is now updated dynamically to show the group mean.

An analyst may now want to see the data for each host on a separate graph to examine it more clearly. Selecting multiple chart control 558 accomplishes this by updating the state of the screen to show the two host graphs side-by-side as in FIG. 6. The table 260 has been toggled to narrow form using table width toggle control 263. Group mean 659 has been removed by deselecting the group mean control 549

The workflow illustrated in FIG. 2 through FIG. 15C of this disclosure is an example of a resource analysis to identify which hosts are being used the most. This workflow can be modeled as a sequence of state transitions as outlined in FIGS. 17-19.

FIG. 16 shows a state transition table 1600 for the table-graph 250 shown in FIG. 2, which is further explained below. As the example workflow is applied to transform it into the table-graph shown in FIG. 7. Each row of the table describes a specific state by its State ID (identifier) and mnemonic state name, its associated FIGS. 1611, the current state details (table state, graph state, number of active data sets and any statistics displayed 1615). If a new event occurs during a state it is listed, along with the next state to which the table-graph will transition.

FIG. 17 shows the sequence of state transitions applied to the base image to progress through this workflow. In this table, each row describes a state by its associated browser window, its mnemonic state name, associated figure number, and its current display state. If an event occurs during the state, the event and its corresponding control are shown along with a descriptive comment and the next figure to which the display transitions.

At this point, an analyst may have a few follow-up queries to help isolate particular usage issues. In this example, three are given:

1) What was the network traffic by host per day over the past 60 days?

2) Show me read bytes by host metric per day over the past 60 days.
3) Show me write bytes by host metric per day over the past 60 days.

FIGS. 8-14B are described in the first use case, above, to illustrate how a user such as an analyst, site reliability engineer, security engineer, systems administrator, or other user can expose and unravel successive levels of detail using the disclosed technology. In summary, FIG. 8 through FIG. 10D cover the query on network traffic. FIG. 11 through FIG. 12B cover the query on read bytes. FIG. 13 through FIG. 14B cover the query on write bytes.

User Interface State Transitions

Interactive GUI features and transitions among the features can be described as states and transitions, whether or not they are implemented using a state machine. The state and transition description that follows includes multiple states for some of the figures previously designed. The table in FIG. 16 categorizes these states via the columns shown in 1615 by whether:

the table is narrow or wide (Current table state),
one or multiple graphs are showing (Current graph state),
one or two data sets are active (Number of active data sets), and
statistics such as group mean (Current statistics) are displayed.

Some of these categories follow directly from selectable controls, such as the multiple charts control 558 and the group mean control 549. The number of active data sets attribute shifts between an original query and a follow-up query. The table width expands from abbreviated to expanded when the user elects to widen to expose the whole name of a row. New events and their resulting next states are also shown in columns 1617.

FIG. 16 shows a state table 1600 that summarizes one progression of states, rather than all the possible transitions that can apply to each state. The technology disclosed includes controls that support transition from a state to most any other state, sometimes requiring multiple transition steps when multiple state categories are changed. This particular progression corresponds to FIGS. 2-6. A numeric state ID and mnemonic state name are assigned to each state. The mnemonic state name corresponds to the figure for each state and the state of the UI (user interface) elements on the figure. For instance, the state name "NarrSing1", exemplified by state ID 1, indicates that the table-graph in the state is narrow, the graph displays all the data on a single chart, and there is only one data set. The state name WideMult2Mean, exemplified by state ID 5, indicates that the table in the table graph is wide, that each data set is displayed on its own chart (i.e., there are multiple charts—one for each data set), that two data sets are displayed and that the group mean for the two data sets has been calculated and is shown on the display.

The changes in each row in state table 1600 as the states transition are highlighted and written in bold letters. Other state transitions not shown are possible. This particular sequence was used as an example to illustrate various interactions between the components of a table-graph.

State 1, NarrSing1, is the initial state of the user interface after the main query 210 is executed. This is shown in FIG. 2. In the example given, an analyst is getting a general overview of all CPU usage in the environment. However, the names of the hosts are abbreviated in the table 260. To make them fully visible, the analyst can use table width toggle control 263 to widen the table. At this point, the user interface transitions to state ID 2, WideSing1.

State 2, WideSing1, shows the full names of the hosts in the tabular information, but only the top host is shown on the graph. Adding a particular data set of interest, can be done by selecting it via row selection control 464 in FIG. 4. This immediately moves it up to the second position in the table since the tabular information is shown in descending order with the activated data sets at the top. Simultaneously the selected data set is added to the chart as shown by legend 579 in FIG. 5 The resulting state is state 3, WideSing2.

State 3, WideSing2, shows both data sets as activated and displayed on the graph so the user can quickly compare them. To get a sense of average performance, the example workflow includes adding the group mean to the chart. The result is state ID 4, WideSing2Mean.

State 4, WideSing2Mean, shows, as in FIG. 5, the widened table with both selected data sets on a single graph and the group mean. To see the individual data set graphs more clearly, the user can use the multiple charts control 558, transitioning to state ID 5, WideMult2mean.

State 5, WideMult2Mean, updates the display to that shown in FIG. 6. To gain a bit more space to view the charts, a user can narrow the table. The display transitions to state ID 6, NarrMult2Mean.

State 6, NarrMult2Mean, is also shown in FIG. 6. At this point, the group mean is removed by toggling its control 549. The result transitions to state ID 7, NarrMult2.

State ID 7, NarrMult2, is also shown in FIG. 6. The table component of the table-graph has been narrowed. The selected data sets appear on multiple charts with no statistics. This completes the first example sequence of figures that illustrate dynamic interactions among the components in a table-graph.

The foregoing progression of states summarized in FIGS. 16-17 illustrate the state driven nature of a table-graph, emphasizing the dynamic interactions between the table, the graph and the controls to facilitate a natural workflow for a user that lets him concentrate more on the goal of his task instead of the mechanics of the tools.

FIG. 17 is a complementary view of FIG. 16, showing a table that summarizes the state of the displays shown in FIGS. 2-15C. Columns showing the current browser window, state name and figure number 1711 are shown for each row in the table. If a next FIG. 1719 is generated as a result of an event, then the associated control, the event and an explanatory comment are indicated as in columns 1715. If no event occurs in the example figures, then those columns show "none."

FIG. 17 is a complimentary view of the same workflow as in FIG. 16. It shows a table that captures the state changes in FIGS. 2-7 as a user follows the workflow given above for these figures. The current browser window, state name and the main figure displayed in that window are indicated in columns 1711. The current display state of the table and the graph are shown in column 1713. Selected controls for each entry, corresponding event and explanatory comment are shown in 1715. The resulting next figure is shown in the column 1719. Note that FIGS. 3A-3C do not have any associated events. They are included for completeness and show additional panels that are associated with the main panel shown in FIG. 2. If no event occurs in the example figures, then those columns show "none." The term "Follow" has been added to the state name for FIG. 7: "NarrMult2Follow" indicates that the table is narrow, the graphs are multiple, there are two data sets active and a follow-up query popup window is shown.

FIGS. 18-19 extend the table shown in FIG. 17 to include FIGS. 8-15C to show creation of a Liveboard (explained below) and displays associated with data views. Again, note that several of the figures have no associated actions and are included for completeness in following the example workflow. The terms "Bar" (indicating a bar chart), "Chart" (indicating only a chart shown), "Table" (indicating only a table shown) have been added to state names in FIG. 18. Likewise, in FIG. 19, the terms "Live" (Liveboard shown), "LiveSummary" (Liveboard summary shown), and "LiveSaveCollab" (Liveboard being saved with collaboration option) have been added in table 1900 of FIG. 19. All the terms containing "Live" apply to FIGS. 15A-C which are described above and include details of how to save and use a Liveboard.

Liveboards and Strategy Analysis Packages Introduced

Standardized data formats are popular in multi-tenant environments, because they allow multiple users to share a apps that run against their partitions of a shared physical data structure. However, many organizations are reluctant to comingle their data in the same data structures as their competitors.

An alternative to shared physical data structures uses customizable loaders that apply late binding schemas to serialized data. When different parties use the same loader, without customization, they are likely to end up with the same data fields in their schema. However, customizable loaders are complicated to program, typically using (cryptic) regular expressions, and subject to inconsistent adoption.

Marketplaces for third-party developed apps have become popular, not limited to smart phones. In a multi-tenant database environment, a market has emerged for third-party apps, because the shared physical data structure assures substantial similarity in schemas, which is necessary for sharing analytic packages over multi-tenant databases. In the late binding schema environment, shared analytics depend on shared custom loaders to generate a common schema. In both marketplace environments, posting a new app requires substantial coding, time, and vendor certification before the new app can go live.

Marketplaces cannot move quickly enough to respond to emerging vulnerabilities or operations issues, because of the technology on which they rely. As issues emerge, analysis of vulnerabilities and breaches need to be immediate. For instance, the FTC (Federal Trade Commission) advises taking all affected equipment offline and not shutting down the equipment until forensic experts arrive. This need for immediacy cannot be serviced by app stores.

Applicant has a new approach that combines standardized data formats and so-called clear share publishing of an analysis strategy package, sometimes referred to herein as a "Liveboard." Standardized data formats can be accomplished without a shared physical data structure, by adopting sanctioned data loaders or even unsanctioned loaders that load a standard schema. Care is required when building to a standard schema, in clarity of the standard and regression testing of resulting schemas. A standard schema can help enable immediate execution of the so-called clear shared package against proprietary operations data.

Standardized data loading is more easily in reach when the focus is cloud based computing platforms. There are relatively few cloud-based platforms, compared, for instance, to data appliances. Even data appliances from a single vendor vary over time. There is more consistency and, therefore, many fewer sources to map into a standard format or for a query engine to understand, among cloud-based platforms than among the appliances addressed by late binding schemas. Standardized data loading is practical in the realm of cloud-based platforms.

Clear sharing refers to sharing a package that has clearly observable contents. Such packages are quickly shared and readily trusted when they are simple. For instance, a package can be limited to descriptive plaintext, an initial natural language query executable by a database system, a selection of initial query responses or data views produced by the database system without further programming, a follow-up natural language query executable by the database system, a selection of follow-up query responses again produced by the database system without further programming. The natural language queries are clear, because they are human readable in plain language and there is little opportunity for mischief and no opportunity for code injection. What a user sees in a natural language query is what the system gets. The selected query responses or data views are chosen from among results produced by the database system without further programming, so only trust in the database system is needed, not trust in the organization that shared to package.

Absence of code compiled by the organization that shared the package can help make it clear what the package contains. Compiled code is opaque. Measures taken to earn trust in compiled code, such as vendor certification, are time consuming to implement and potentially evaded. If compiled code elements are essential, measures such as a certified library of compiled code segments and transparent manifests for library segments can make it acceptable to use some compiled code, at an incremental decrease in trustworthiness and a corollary increase in risk. Pre-established library segments can be used to produce data views without increasing the overhead of sharing.

Quick sharing of analysis strategy packages is enabled by a combination of a sharing platform, a simple package format, and either standardized data or a database system that can apply the same natural language query to non-standardized data. With this innovative approach, an analysis strategy for addressing a vulnerability or fixing an operations problem, such as one caused by a bad upgrade, can be published in minutes or hours, instead of day or weeks. Quickly shared strategies can be explored and executed against live data, in a trustworthy way, without any data leakage between a first, publishing organization and a second, consuming organization.

Figure 15A:
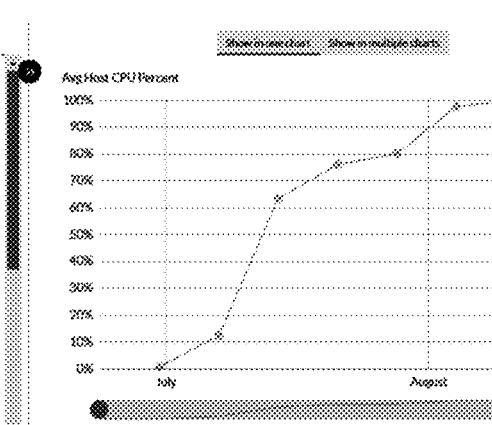
FIGS. 15A and 15B show an interface for a saved sequence of queries called a "Liveboard."
Figure 15B:
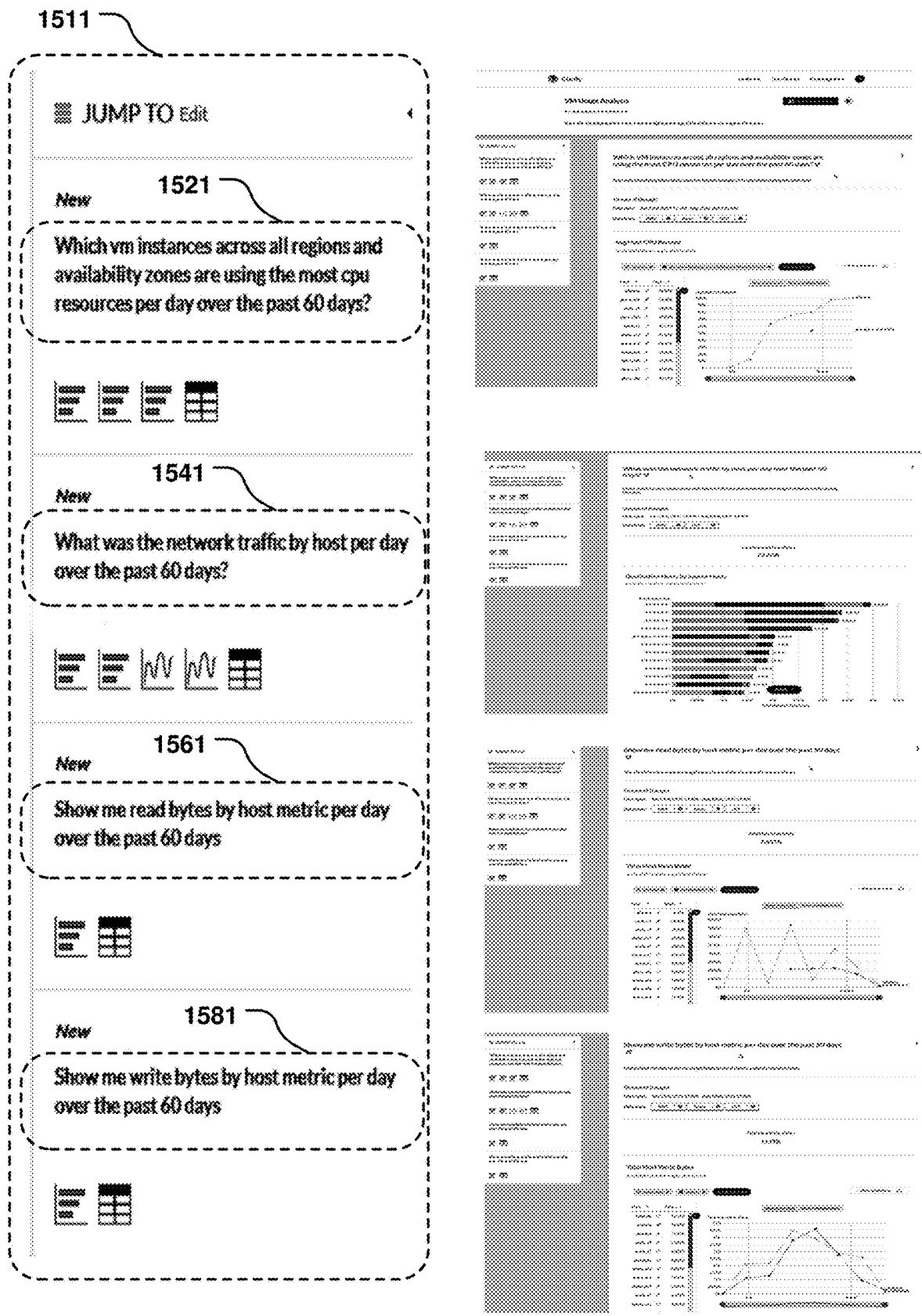

FIGS. 15A-15C play on the CPU resources question, above, to introduce so-called "Liveboards" that include multiple natural language questions and selected answer views of data, saved from past experience by an origin organization, that can be shared between organizations even if they use different cloud platforms and have loaded different data from respective cloud platforms. The natural language questions are processed against the user organization's loaded data, without dependence on an origin organization's loaded data or on the origin organization's platform(s). In alternative implementations, the natural language questions may be phrased as requests. For instance, they may begin with a directive like "Show me . . . .", as in "Show me network traffic . . . ", "Show me host logins . . . ", and "Show me read and write bytes . . . ".

FIG. 15A shows a "Liveboard" that was created by saving the initial question and the three follow-up questions, as depicted in FIGS. 2-14B. The natural language questions in this Liveboard can be shared with other users. Natural language questions are automatically converted, for the other users, into queries against their available data, even if it is different than the data available to the origin organization. When queries derived from the Liveboards are rerun for a user organization, answer views are automatically repopulated, and data displays regenerated with data from the user organization. As an enhanced feature, follow-up queries could also be automatically executed if the necessary data is available. A packaged follow-up query could produce an explanation that more or different data should be imported from the cloud source, if it is not immediately available to a consuming organization. An overall analysis title for the Liveboard, such as VM Usage Analysis, is given 1505 and a navigation panel 1511 is provided for quickly jumping to a particular question.

FIG. 15B shows an enlarged view of the navigation panel 1511. This navigation panel permits quick access to the initial question and follow-up questions. Optionally, small panels of sample results for one or more questions can appear next to the question list navigation panel 1511. The types of data views associated with listed questions 1521, 1541, 1561, and 1581 can be represented by icons that are shown below the questions. An experienced user will appreciate the types of data that the system represents in stacked bar graphs, time series plots, tables and the like. Knowing which views are available can cue a user when selecting among the questions offered. When a user selects one of the questions, a new browser tab opens, the associated quer(ies) are executed and resulting data views are immediately available in panel(s). Alternatively, a current window can be scrolled to the selected panel.

FIG. 15C shows saving and sharing a Liveboard. This save operation is for the VM Usage Analysis, which included an initial question and three follow-up questions in the preceding figures. A user can save a Liveboard while performing an analysis, tracking down a performance or security issue, or any conducting other investigations and exploration of their cloud data. When a user saves an analysis sequence 237, they can create a new Liveboard 1581 and optionally add one or more collaborators 1578. Collaborators receive an invitation via a messaging system or email. As soon as they accept, they have access to the shared Liveboard and can begin adding their own queries and result panels to the Liveboard as well as see all updates done by other collaborators. Once a Liveboard is captured, it can be edited to delete or add data views, questions, etc.

As a user saves queries and panels, they are arranged sequentially to capture the user's workflow. This sequential arrangement can be done using a scrolling web page, multiple browser tabs, and similar alternatives. Additionally, in other implementations the original sequence can be edited or rearranged. By storing a user's workflow in this fashion, a Liveboard acts at a higher level: it does not need to store the actual results of queries. Rather, it stores the sequence of queries so they may be executed "live" using whatever data sources a user chooses. Thus, Liveboard results are real time, dynamic and specific to the environments and data sources for a given user. They are also portable and easily shared for reuse and collaboration among many users with their own data.

Sharing a Liveboard with other organizations does not give them access to the origin organization's data, only to questions, queries and data views that are part of the analysis encapsulated in the Liveboard. It can also be shared with users having different data sources. Invoking a Liveboard involves reformulating and running queries derived from the natural language questions and creating data views. A user selects questions to answer and associated data views using the navigation panel 1511 in FIG. 15.

Use Case 2: Liveboard and Collaboration

FIG. 15A shows a "Liveboard" that was created by saving the initial query 210 and the three follow-up queries 801, 1201, and 1401 in FIGS. 8, 12A and 14A, respectively.

FIG. 15B shows an expanded view of the Liveboard navigation panel 1511 in FIG. 15A and the four corresponding top screens resulting from each query.

Once a sequence of queries and any additional panels are saved as a Liveboard, they may be shared with other users inside or outside of an organization. When shared with users having access to the same data, all such users will see the same or closely similar results as these are computed in real time based on the same natural language queries.

Additionally, a user accessing different data will also be able to invoke queries packaged in the Liveboard, with different results from accessing different data. The underlying database engine can automatically repopulate the displayed screens using their data. As an enhancement, follow-up queries could also repopulate displayed screens if the necessary data is available.

FIG. 15C shows how a Liveboard can be shared dynamically while a user is actively using the disclosed technology. In the implementation shown, when a user saves a query as in 237, they can create a new Liveboard as in 1581 and optionally add one or more collaborators 1578 in real time to that Liveboard.

Collaborators then receive an invitation via a messaging system or email. As soon as they accept, they have access to the shared Liveboard and can begin adding their own queries and panels to the Liveboard as well as see all updates done by other collaborators. This can all be done in real time. Alternatively, collaborators can subscribe based on selected criteria to receive updates by notifications and alerts via mobile devices or email as well.

Two categories in which rapid collaboration between organizations can be particularly helpful are reliability and security. Reliability deals with network issues controlled directly or indirectly by the operator: for instance, storage allocation is under a user's control whether he can manage it directly or set the parameters for a third party system to manage it. Thus, if no more storage is available, it's a reliability problem that should have been foreseen and planned for. On the other hand, security exploits and attacks are usually not under user control (unless the user has failed to install known patches for instance), whether they be from internal or external sources.

The following is an example scenario for applying a general "security" best practice that has just become time critical as a result of a recent security exploit:

1) The latest security newsfeeds have just released news that a crimeware group like Fin7 is probing corporate networks to discover unsecured public Amazon S3 buckets.
2) A Liveboard is built that incorporates a series of natural language queries to daylight any public S3 buckets. These queries might ask: Which S3 buckets are public? What is the network traffic to/from these public S3 buckets? Is there any traffic to/from suspect domains (Ukraine, Latvia)? Thus, potential targets can be surfaced and secured.
3) The new Liveboard is made available to customers via a website or email so that they can immediately apply it.
4) The threat/vulnerability of the newly discovered cyber-security exploit has now been mitigated in a timely fashion.

Here is another example scenario. This one applies a general performance related "reliability" best practice that could become time critical for a network that is being scaled up to handle more traffic. The focus in this example is to make sure there is ample storage available for the anticipated increase in network traffic. In this case the disk I/O in the network is queried and the respective servers are examined for usage and availability. The results can quickly provide the insight needed by an analyst to decide if adequate storage is available as the network is scaled up for more traffic and transactions.

Another example of a scale related reliability scenario is as follows: a production instance of a system is being run on a Microsoft server supported by experienced in-house expertise familiar with the MS environment. However, it is known that this environment may not be able to support the intended scaling. The in-house team responsible for the scaling has a hard deadline but needs to have a backup plan in place. So, the system database is replicated on a different platform like Amazon RDS (relational database service), but the in-house team has very little expertise here, thus the team must learn how to use this new platform quickly. If the MS environment crashes, there is no time to learn the Amazon tools. Instead, by using the technology disclosed, the same natural language queries on the Amazon platform can be re-used and the results will appear in the same format. Thus, the knowledge gap is shortened or eliminated since the same tools work seamlessly on both environments.

Another best practice is checking credentials: Credentials like keys, passwords and certificates are used to permit access to computing resources, including sensitive data and programs in databases, virtual machines or web infrastructure components. In many organizations, there is a team responsible for assigning and managing these.

Once assigned, credentials often remain valid for years and never expire. If stolen, they can be used by an attacker to gain access to critical resources. A better practice is for teams to assign expiry dates to all credentials, have automatic processes that monitor and enforce these dates, and actively monitor credentials to check their current status against the expiry dates.

For instance, if a key creation time is more recent than its last access time, this may indicate that an attacker has used the key and is now trying to cover his tracks by forging the time stamp. If that is the case then an analyst must quickly discover what resources have been compromised and take appropriate action. A Liveboard with a series of natural language queries can be created to handle this general scenario, and shared with a user community.

These scenarios illustrate several instances in which technology can be rapidly shared among organizations using analysis strategy packages applied to standardized operations data.

Computer System

Figure 20:
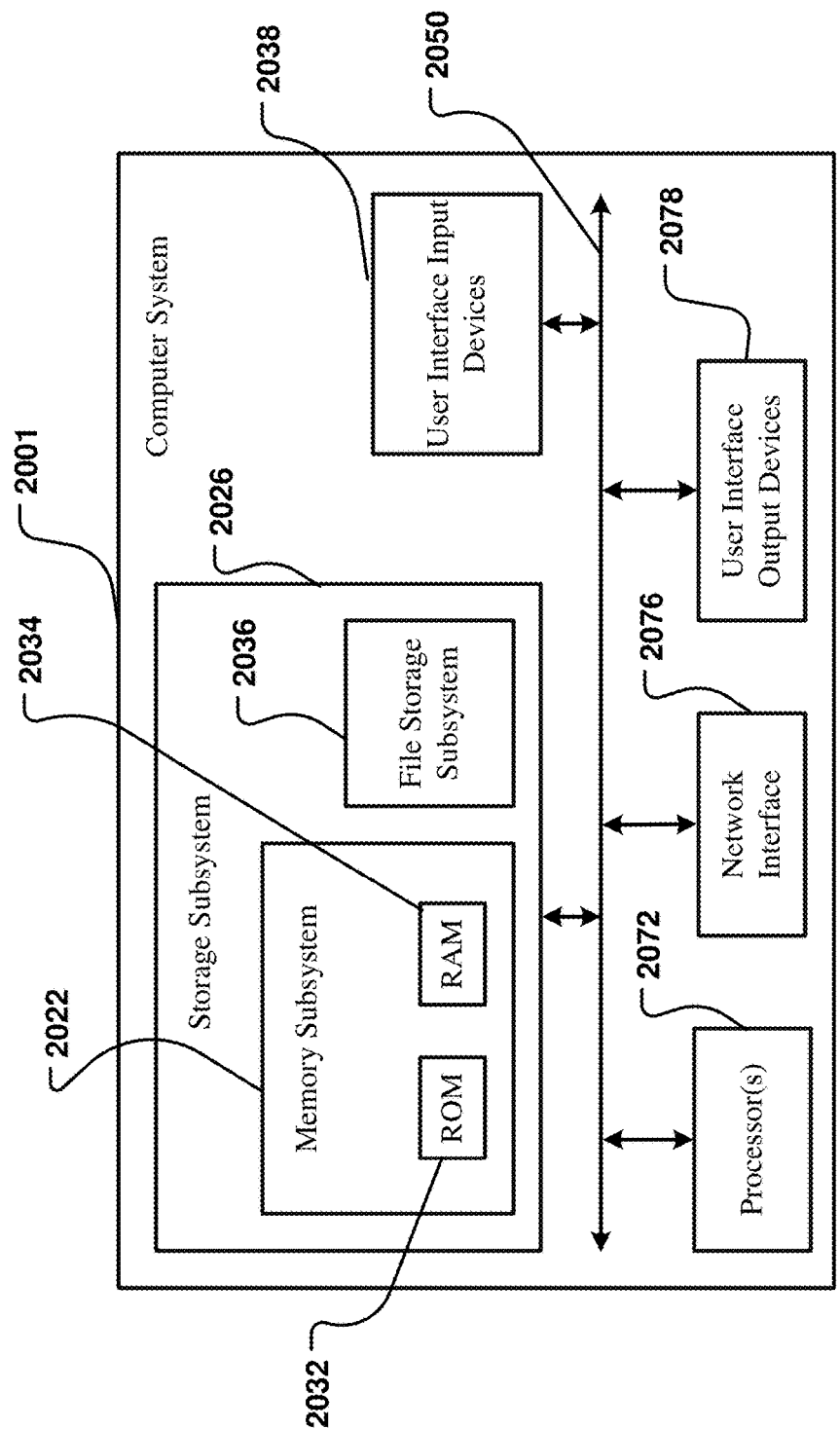
FIG. 20 shows an example computer system used for implementing the technology disclosed herein.

FIG. 20 is a block diagram of an example computer system 1600 for implementing the disclosed technology. FIG. 20 is a block diagram of an example computer system, according to one implementation. The processor can be an ASIC or RISC processor. It can be an FPGA or other logic or gate array. It can include graphic processing unit (GPU) resources. Computer system 2001 typically includes at least one processor 2072 that communicates with a number of peripheral devices via bus subsystem 2050. These peripheral devices may include a storage subsystem 2026 including, for example, memory devices and a file storage subsystem, user interface input devices 2038, user interface output devices 2078, and a network interface subsystem 2076. The input and output devices allow user interaction with computer system 2001. Network interface subsystem 2076 provides an interface to outside networks, including an interface to corresponding interface devices in other computer systems.

User interface input devices 2038 may include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include the possible types of devices and ways to input information into computer system 2001.

User interface output devices 2078 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide a non-visual display such as audio output devices. In general, use of the term "output device" is intended to include the possible types of devices and ways to output information from computer system 2001 to the user or to another machine or computer system.

Storage subsystem 2026 stores programming and data constructs that provide the functionality of some or all of the modules and methods described herein. These software modules are generally executed by processor 2072 alone or in combination with other processors.

Memory 2022 used in the storage subsystem can include a number of memories including a main random-access memory (RAM) 2034 for storage of instructions and data during program execution and a read only memory (ROM) 2032 in which fixed instructions are stored. A file storage subsystem 2036 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 2036 in the storage subsystem 2026, or in other machines accessible by the processor.

Bus subsystem 2050 provides a mechanism for letting the various components and subsystems of computer system 2001 communicate with each other as intended. Although bus subsystem 2050 is shown schematically as a single bus, alternative implementations of the bus subsystem may use multiple busses.

Computer system 2001 can be of varying types including a workstation, server, computing cluster, blade server, server farm, or any other data processing system or computing device. Due to the ever-changing nature of computers and networks, the description of computer system 2001 depicted in FIG. 20 is intended only as one example. Many other configurations of computer system 2001 are possible having more or fewer components than the computer system depicted in FIG. 20.

Particular Implementations

The technology disclosed can be described from the perspective of a host responding to a user or the perspective of the user.

CRM Claim Set for the Interactive GUI

In one implementation, a computer readable media, deliverable by a server to a client machine, is described, which includes data responsive to a query and program instructions that, when executed on the client machine, cause execution of a method. The method, executed after delivery of the media to the user workstation, includes displaying an interactive GUI that displays at least the query and responsive information. In this method, the responsive information includes contextual information that identifies a data source used to respond to the question and a table-graph. The table-graph shows, side-by-side, selectable rows of tabular information and a graph of selected rows of the tabular information, with legend labels that identify elements of the graph corresponding to the selected rows.

This article of manufacture and the method implemented, and other implementations of the technology disclosed, can include one or more of the following features and/or features described in connection with additional methods disclosed. In the interest of conciseness, the combinations of features disclosed in this application are not individually enumerated.

In this method, the query can be a question posed in a natural language. The display includes element display controls for selection of particular rows from the selectable rows. Responsive to receiving a selection or deselection input from a user, directed to a particular display element control for selection of a particular row, the method proceeds with causing the graph to display or hide, respectively, a particular element corresponding to the particular row corresponding to the particular display element control, with the legend label that identifies the particular element of the graph corresponding to the particular display element control.

The method can further include providing an input sensitive area associated with each legend label. Then, responsive to receiving a selection input from a user, directed to the input sensitive area associated with a particular legend label, the method proceeds with displaying a pop-out panel of suggested follow-up queries framed in the pop-out panel. The suggested follow-up queries can be generated automatically based on the query and a particular row corresponding to the particular legend label.

The method can further include providing input sensitive areas associated with each suggested follow-up query. Then, responsive to receiving a selection input from the user, directed to the input sensitive area associated with a particular suggested follow-up query, the method proceeds with displaying further responsive information prompted by the particular suggested follow-up query. The further responsive information can include further contextual information that identifies a further data source used to respond to the particular suggested follow-up query and a further table-graph.

The method can further include providing input sensitive areas associated with each suggested follow-up query. Then, responsive to receiving a selection input from the user, directed to the input sensitive area associated with a particular suggested follow-up query, the method proceeds with displaying further responsive information prompted by the particular suggested follow-up query. The further responsive information can include further contextual information that identifies a further data source used to respond to the particular suggested follow-up query and a further graph or table.

The method can further include providing a free text window in the pop-out panel for entry of a user-composed follow-up query. Then, responsive to submission by the user of the user-composed follow-up query, displaying further responsive information, within a context of the query, prompted by the user-composed follow-up query. The further responsive information can include further contextual information that repeats the data source used to respond to the user-composed follow-up query and provides a further graph or table.

The method can further include providing an input sensitive area associated the query or the table-graph. Then, responsive to receiving a selection input from a user, directed to the input sensitive area associated with the query or the table-graph, displaying a pop-out panel of suggested follow-up queries framed in the pop-out panel. The suggested follow-up queries ca be generated automatically based on the query and selectable rows of tabular information.

The method can further include providing input sensitive areas associated with each suggested follow-up query. Then, responsive to receiving a selection input from the user, directed to the input sensitive area associated with a particular suggested follow-up query, the method can proceed with displaying further responsive information prompted by the particular suggested follow-up query. The further responsive information can include further contextual information that identifies a further data source used to respond to the particular suggested follow-up query and a further table-graph.

The method can further include displaying a multi-charts control to cause display of multiple individual charts for the selected rows of the tabular information. Then, responsive to receiving a selection input from a user, directed to the multi-charts control, causing the graph to include individual charts for the selected rows.

The method can further include displaying a series average control to cause display of an average of multiple selected rows of the tabular information. Then, responsive to receiving a selection input from a user, directed to the multi-charts control, causing the graph to display an element for the average of multiple selected rows of the tabular information. This can be extended by causing the graph to display additional statistics derived from the multiple selected rows of the tabular information.

Other implementations may include a computer implemented system to perform any of the methods described above. The method implemented by executing the CRM can be claimed without mention of the CRM.

Method for Analysis Strategy Package Claims

As indicated above, the technology disclosed can be described from the perspective of a host responding to a user or the perspective of the user, either a producer or consumer of an analysis strategy package. The package itself can be practiced as a computer readable media, uploaded from a first organization to a server and deliverable by the server to a second organization.

As above, this article of manufacture and the method implemented, and other implementations of the technology disclosed, can include one or more of the following features and/or features described in connection with additional methods disclosed. In the interest of conciseness, the combinations of features disclosed in this application are not individually enumerated.

In one implementation, this technology is described as a method of rapidly deploying queries for investigation of issues in network operations, to be used by a second organization that has proprietary operations data. From the perspective of a server, this method includes receiving and saving in a standardized form an analysis strategy package, applicable to proprietary operations data of multiple organizations, wherein the analysis strategy package was developed by a first organization from analysis of proprietary operations data available to the first organization. This analysis strategy package can include a descriptive title or narrative introduction to an analysis strategy, an initial natural language query, selected initial data views produced responsive to the initial natural language query, at least one follow-up natural language query, and selected follow-up data views produced responsive to the follow-up natural language query. A narrative introduction is sufficient, but a long descriptive title is likely to serve the same purpose. This part of the method improves on prior application packaging technologies by being extraordinarily easy to deploy, without requiring host site review and approval, and presenting little or no risk from execution. Rapid deployment and availability can be accomplished in the disclosed analysis strategy package format.

The analysis strategy package is configurable to be invoked by the second organization against the second organization's proprietary operations data, without depending on access to the first organization's operations proprietary data. Invoking the analysis strategy package is designed to cause execution against the second organization's proprietary operations data of the initial natural language query, production of the selected initial data views responsive to the initial natural language query, execution against the second organization's proprietary operations data of the follow-up natural language query, and production of the selected follow-up data views responsive to the follow-up natural language query.

The method further includes providing electronic access for the second organization to invoke and automatically apply the analysis strategy package to the second organization's proprietary operations data. This part of the method improves on prior app stores by being easy to deploy and execute against the second organization's proprietary operations data, which can be practiced as a one-step download, install and invocation.

Practicing this technology, some implementations of the analysis strategy package do not include any object code provided by the first organization. Alternatively, the analysis strategy package includes object code provided by the first organization that does not modify searching of the second organization's proprietary operations data based on the natural language database queries provided. In some implementations, the strategy analysis package does not include any source code provided by the first organization. Alternatively, the analysis strategy package includes source code provided by the first organization that does not modify searching of the second organization's proprietary operations data based on the natural language database queries provided. In some implementations, invoking the analysis strategy package does not require compiling or linking any code provided as part of the analysis strategy package. Alternatively, the analysis strategy package can require compiling or linking of code provided as part of the analysis strategy package, without modifying the searching of the second organization's proprietary operations data based on the natural language database queries provided.

The method can further include providing the electronic access to the second organization to invoke the analysis strategy package without delay required for an intermediate step of certification by a hosting organization that provides the electronic access. As a result, electronic access for the second organization to invoke the analysis strategy package can be provided within an hour of the receiving, or even within 30 minutes or within 15 minutes. When the process is electronic, without human intervention, the lower bound on availability may be as quick as a few seconds.

This technology can be applied to proprietary operations data of each of the first and second organizations that includes operations data from cloud computing platforms about operations using resources of the cloud computing platforms.

In some implementations, the proprietary operations data of the first and second organizations is stored, at least in part, according to a common schema. This makes it easier to process a natural language query prepared by a first organization against data proprietary to a second organization.

The proprietary operations data of the first and second organizations can include operations data from at least two different cloud computing platforms. The operations data from different cloud computing platforms can be standardized and stored, at least in part, according to a common schema.

The selected initial and follow-up data views can consist of or include a subset of data views available to the first organization from a database system processing natural language queries during the first organization's analysis of the proprietary operations data. The subset can be all available data views or a selected subset of data views.

Beyond receiving and making available for invocation, the technology disclosed can further include invoking the analysis strategy package and applying the analysis strategy package to the second organization's proprietary operations data. Invoking the analysis strategy package can causes execution against the second organization's proprietary operations data of the initial natural language query, production of the selected initial data views responsive to the initial natural language query, execution against the second organization's proprietary operations data of the follow-up natural language query, and production of the selected follow-up data views responsive to the follow-up natural language query.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

What is claimed is:

1. A method of rapidly deploying queries for investigation of issues in network operations, to be used by a second organization that has proprietary operations data, the method including:
receiving from a first organization and saving in a standardized form an analysis strategy package, applicable to proprietary operations data of multiple organizations, wherein the analysis strategy package was developed from analysis of proprietary operations data available to the first organization;
wherein the analysis strategy package includes a descriptive title or narrative introduction to an analysis strategy, an initial natural language query, selected initial data views produced responsive to the initial natural language query, at least one follow-up natural language query, and selected follow-up data views produced responsive to the follow-up natural language query;
wherein the analysis strategy package is configurable to be invoked by a user in the second organization against the second organization's proprietary operations data, without depending on access to the first organization's proprietary operations data, whereby invoking the analysis strategy package causes:
execution against the second organization's proprietary operations data of the initial natural language query, production of the selected initial data views responsive to the initial natural language query,
presentation to the second organization user of an option and receipt of a request to execute the follow-up natural language query, execution against the second organization's proprietary operations data of the follow-up natural language query, and production of the selected follow-up data views responsive to the follow-up natural language query; and providing electronic access for the second organization to invoke and automatically apply the analysis strategy package to the second organization's proprietary operations data.

2. The method of claim 1, wherein the standard form of the analysis strategy package includes object code provided by the first organization that, when executed, performs the natural language database queries provided.

3. The method of claim 1, wherein the standard form of the analysis strategy package includes source code provided by the first organization that, when executed, performs the natural language database queries provided.

4. The method of claim 1, wherein the standard form of the analysis strategy package includes compiling or linking of code provided by the first organization that, when executed, performs the natural language database queries provided.

5. The method of claim 1, further including providing the electronic access for the second organization to invoke the analysis strategy package within an hour of the receiving.

6. The method of claim 1, wherein the proprietary operations data of the first organization includes operations data stored on a different cloud computing platform than used by the second organization and both cloud computing platforms can be queried using the initial and follow-up natural language queries in the standardized form.

7. The method of claim 1, further including storing the proprietary operations data of the first and second organizations, at least in part, according to a common schema.

8. The method of claim 1, wherein the proprietary operations data of the first and second organizations includes operations data from at least two different cloud computing platforms, wherein the operations data is standardized and stored, at least in part, according to a common schema across the different cloud computing platforms.

9. The method of claim 1, wherein the initial and follow-up data views provided by the first organization consist of a subset of data views available to the first organization from a database system processing natural language queries.

10. The method of claim 1, further including invoking the analysis strategy package and applying the analysis strategy package to the second organization's proprietary operations data thereby causing:

execution against the second organization's proprietary operations data of the initial natural language query, production of the selected initial data views responsive to the initial natural language query, execution against the second organization's proprietary operations data of the follow-up natural language query, and production of the selected follow-up data views responsive to the follow-up natural language query.

11. A non-transitory computer readable medium including program instructions that, when executed on hardware, implement actions of rapidly deploying queries for investigation of issues in network operations, to be used by a second organization that has proprietary operations data, the actions including:

receiving from a first organization and saving in a standardized form an analysis strategy package, applicable to proprietary operations data of multiple organizations, wherein the analysis strategy package was developed from analysis of proprietary operations data available to the first organization;

wherein the analysis strategy package includes a descriptive title or narrative introduction to an analysis strategy, an initial natural language query, selected initial data views produced responsive to the initial natural language query, at least one follow-up natural language query, and selected follow-up data views produced responsive to the follow-up natural language query;

wherein the analysis strategy package is configurable to be invoked by a user in the second organization against the second organization's proprietary operations data, without depending on access to the first organization's proprietary operations data, whereby invoking the analysis strategy package causes:

execution against the second organization's proprietary operations data of the initial natural language query, production of the selected initial data views responsive to the initial natural language query, presentation to the second organization user of an option and receipt of a request to execute the follow-up natural language query, execution against the second organization's proprietary operations data of the follow-up natural language query, and production of the selected follow-up data views responsive to the follow-up natural language query; and providing electronic access for the second organization to invoke and automatically apply the analysis strategy package to the second organization's proprietary operations data.

12. A system including a hardware processor coupled to the computer readable medium of claim 11.

13. A method of rapidly deploying and executing a query for investigation of issues in network operations, the query having been developed by a first organization and being executed by a second organization, each organization having its own proprietary operations data, the method including:

receiving and saving in a standardized form an analysis strategy package, wherein the analysis strategy package was developed by a first organization from analysis of proprietary operations data available to the first organization, and the analysis strategy package is applicable to proprietary operations data of multiple organizations;

wherein the analysis strategy package includes a descriptive title or narrative introduction to an analysis strategy, an initial natural language query, selected initial data views produced responsive to the initial natural language query, at least one follow-up natural language query, and selected follow-up data views produced responsive to the follow-up natural language query;

providing electronic access for the second organization to invoke and apply the analysis strategy package to the second organization's proprietary operations data;

receiving configuration data from the second organization that maps query fields in the analysis strategy package to the second organization's proprietary operations data, without depending on access to the first organization's operations proprietary data;

receiving instructions from the second organization to invoke the analysis strategy package and invoking the analysis strategy package, including:

executing the initial natural language query against the second organization's proprietary operations data, producing at least one selected initial data view responsive to the initial natural language query, executing the follow-up natural language query against the second organization's proprietary operations data, and producing follow-up data views responsive to the follow-up natural language query.

14. The method of claim 13, wherein the standard form of the analysis strategy package includes object code provided by the first organization that, when executed, performs the natural language database queries provided.

15. The method of claim 13, wherein the standard form of the analysis strategy package includes source code provided by the first organization that, when executed, performs the natural language database queries provided.

16. The method of claim 13, wherein the standard form of the analysis strategy package can require compiling or linking of code provided by the first organization that, when executed, performs the natural language database queries provided.

17. The method of claim 13, further including providing the electronic access for the second organization to invoke the analysis strategy package within an hour of the receiving.

18. The method of claim 13, wherein the proprietary operations data of the first organization includes operations data stored on a different cloud computing platform than used by the second organization and both cloud computing platforms can be queried using a standard natural language query.

19. The method of claim 13, further including storing the proprietary operations data of the first and second organizations, at least in part, according to a common schema.

20. The method of claim 13, wherein the proprietary operations data of the first and second organizations includes operations data from at least two different cloud computing platforms, wherein the operations data is standardized and stored, at least in part, according to a common schema across the different cloud computing platforms.

21. The method of claim 13, wherein the initial and follow-up data views provided by the first organization consist of a subset of data views available to the first organization from a database system processing natural language queries.

22. A non-transitory computer readable medium including program instructions that, when executed on hardware, implement actions of rapidly deploying and executing a query for investigation of issues in network operations, the query having been developed by a first organization and being executed by a second organization, each organization having its own proprietary operations data, the actions including:

receiving and saving in a standardized form an analysis strategy package, wherein the analysis strategy package was developed by a first organization from analysis of proprietary operations data available to the first organization, and the analysis strategy package is applicable to proprietary operations data of multiple organizations;

wherein the analysis strategy package includes a descriptive title or narrative introduction to an analysis strategy, an initial natural language query, selected initial data views produced responsive to the initial natural language query, at least one follow-up natural language query, and selected follow-up data views produced responsive to the follow-up natural language query;

providing electronic access for the second organization to invoke and apply the analysis strategy package to the second organization's proprietary operations data;

receiving configuration data from the second organization that maps query fields in the analysis strategy package to the second organization's proprietary operations data, without depending on access to the first organization's operations proprietary data;

receiving instructions from the second organization to invoke the analysis strategy package and invoking the analysis strategy package, including:

executing the initial natural language query against the second organization's proprietary operations data, producing at least one selected initial data view responsive to the initial natural language query, executing the follow-up natural language query against the second organization's proprietary operations data, and producing follow-up data views responsive to the follow-up natural language query.

23. A system including a hardware processor coupled to the computer readable medium of claim 22.

* * * * *